Sept. 21, 1948.          O. H. BANKER                2,449,964
              AUTOMATIC CHANGE-SPEED TRANSMISSION
Filed Sept. 19, 1940                            8 Sheets-Sheet 3

Inventor:
Oscar H. Banker
By
           Att'y.

Sept. 21, 1948.     O. H. BANKER     2,449,964
AUTOMATIC CHANGE-SPEED TRANSMISSION
Filed Sept. 19, 1940     8 Sheets—Sheet 4
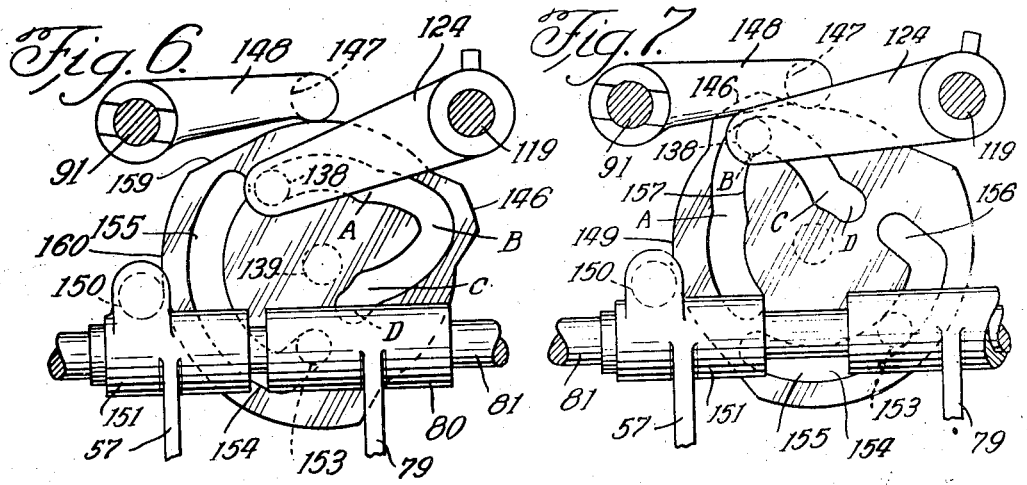
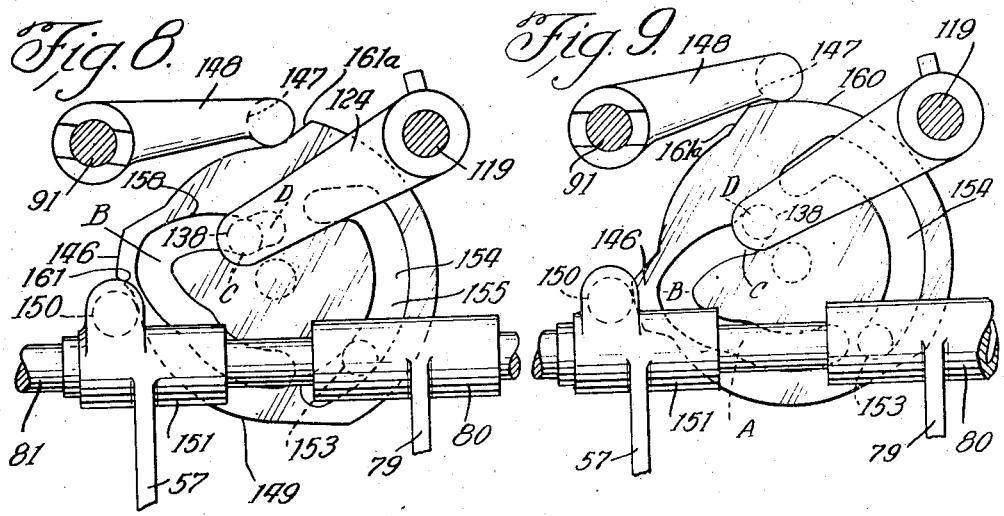
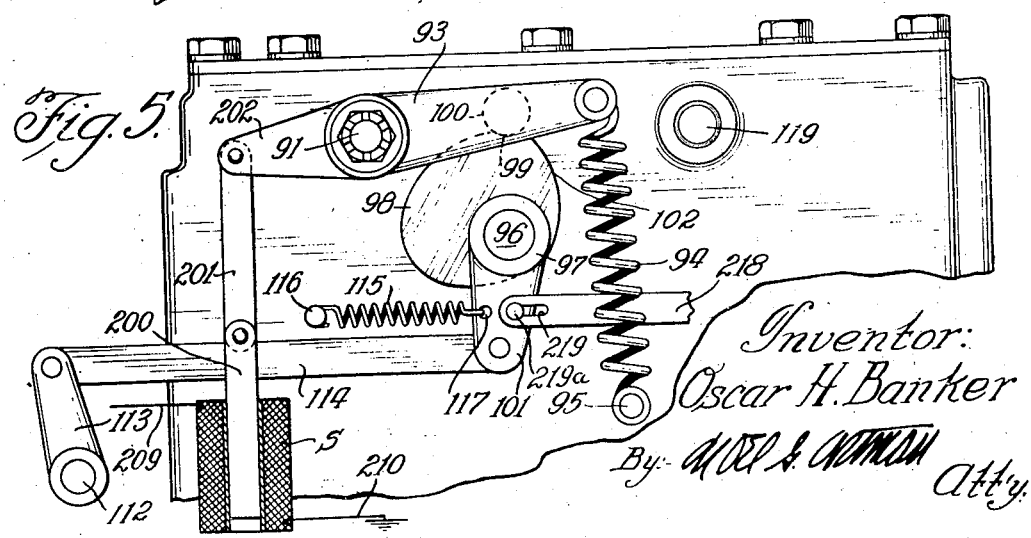
Inventor:
Oscar H. Banker

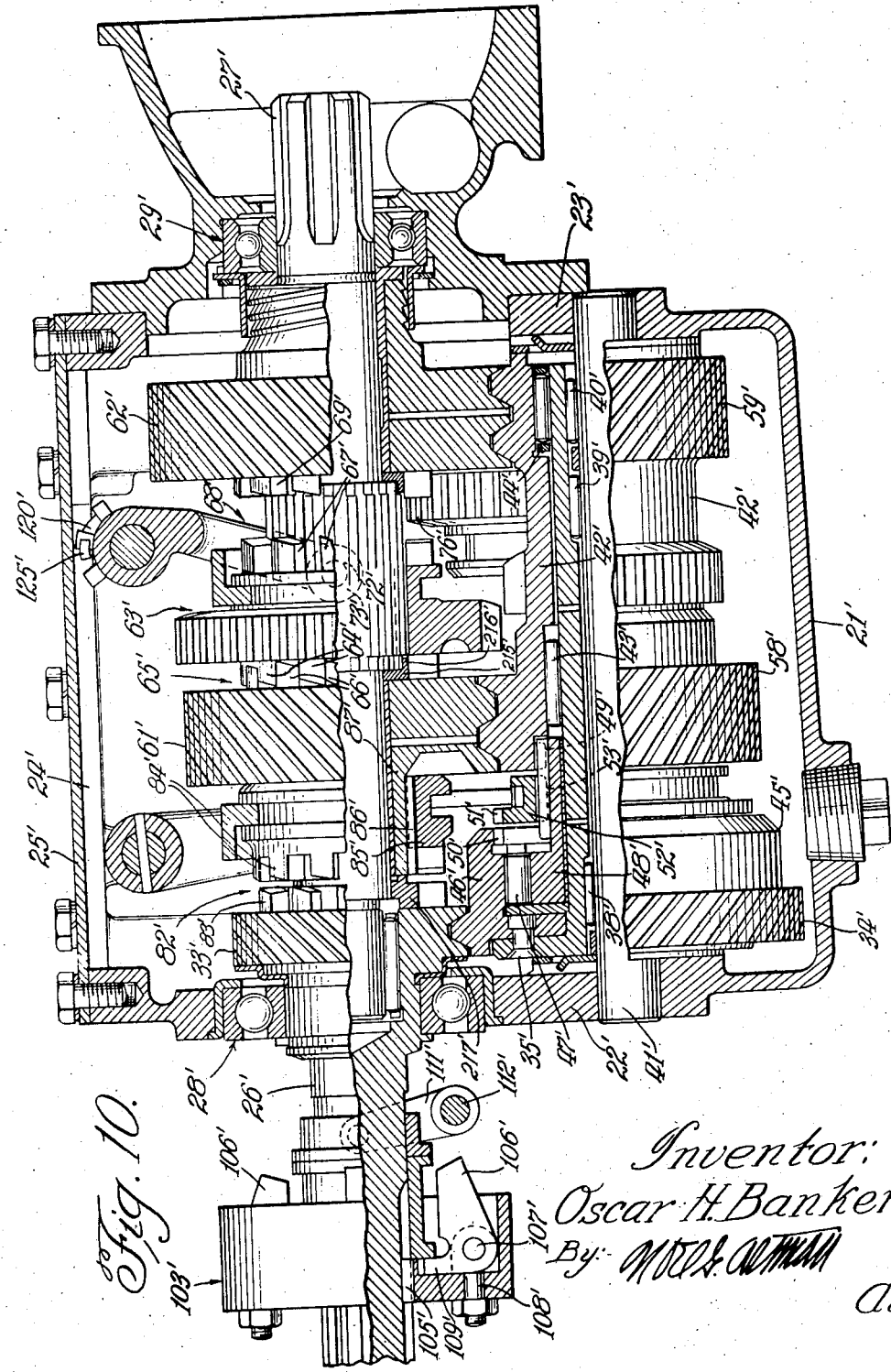

Sept. 21, 1948.   O. H. BANKER   2,449,964
AUTOMATIC CHANGE-SPEED TRANSMISSION
Filed Sept. 19, 1940   8 Sheets-Sheet 6
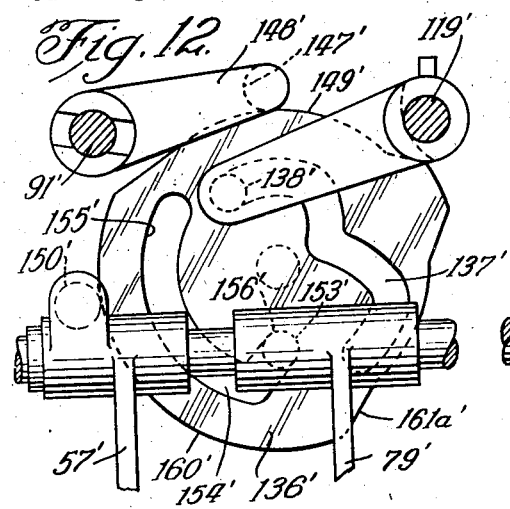
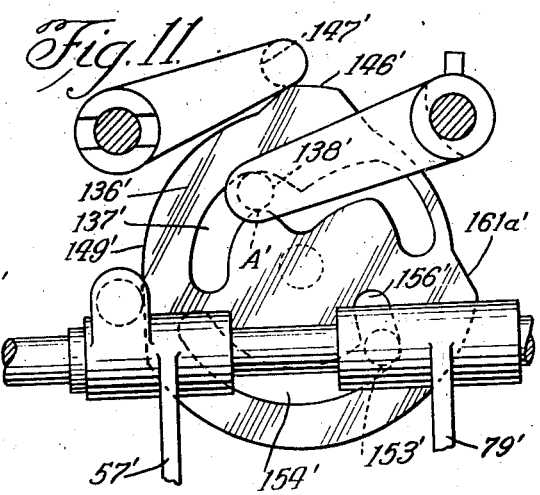
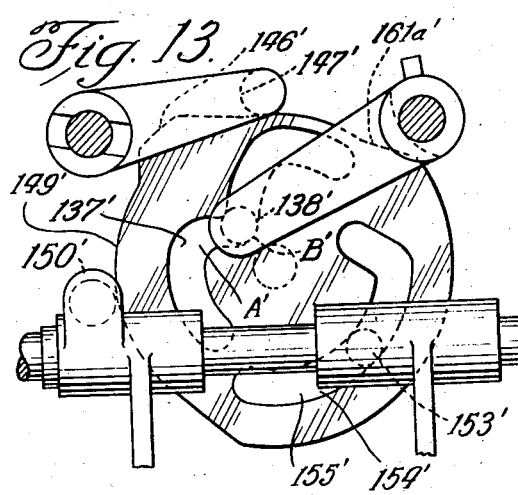
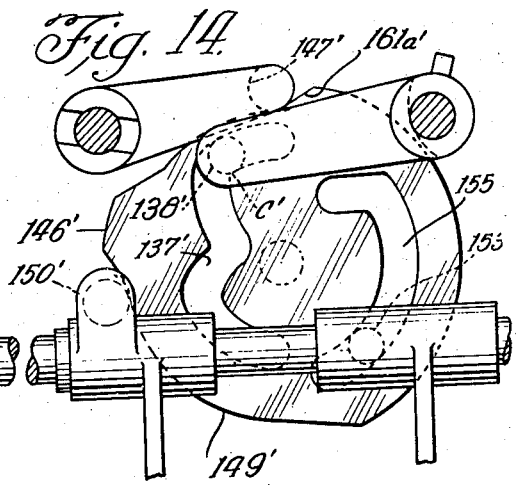
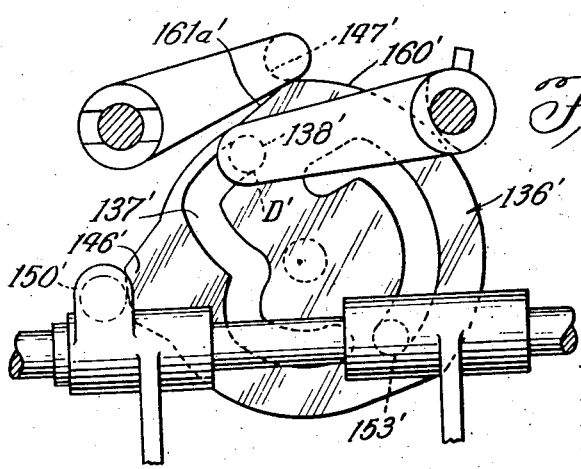
Inventor:
Oscar H Banker Sept. 21, 1948.  O. H. BANKER  2,449,964
AUTOMATIC CHANGE-SPEED TRANSMISSION
Filed Sept. 19, 1940  8 Sheets-Sheet 7
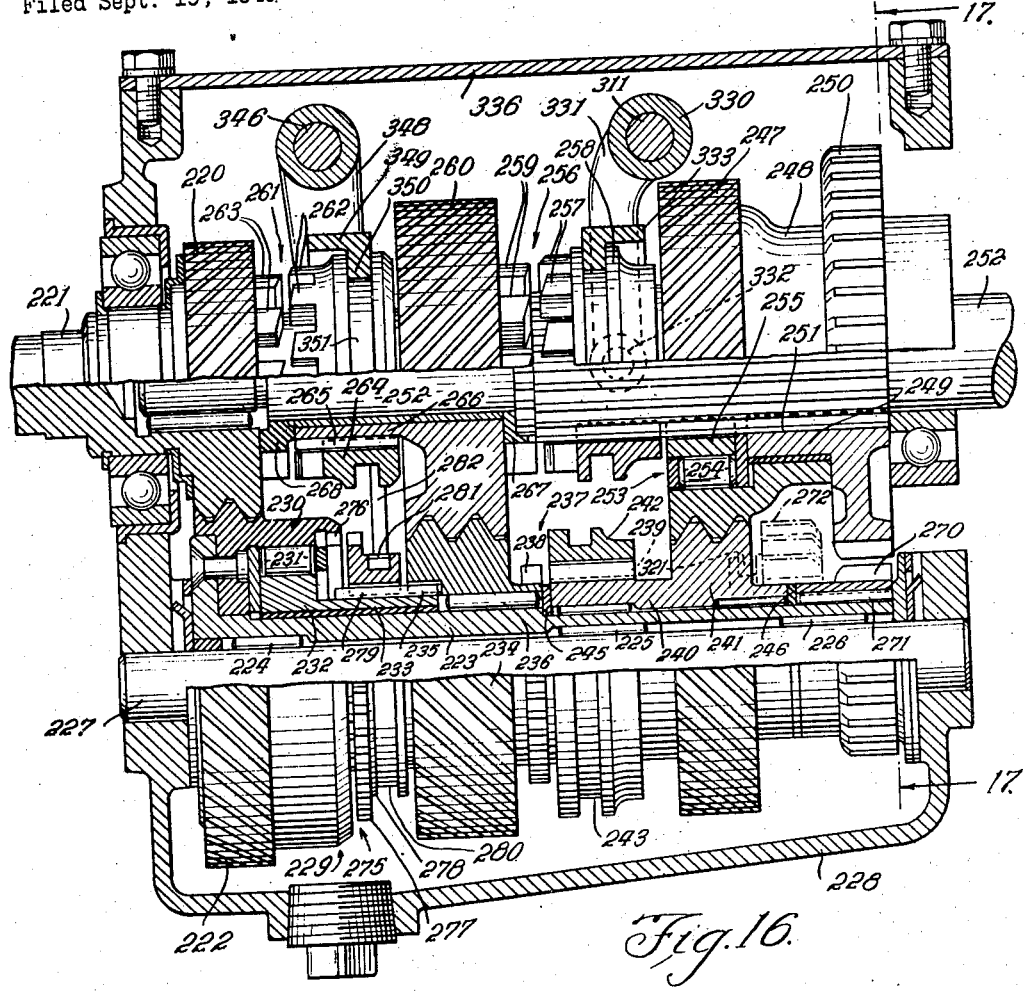
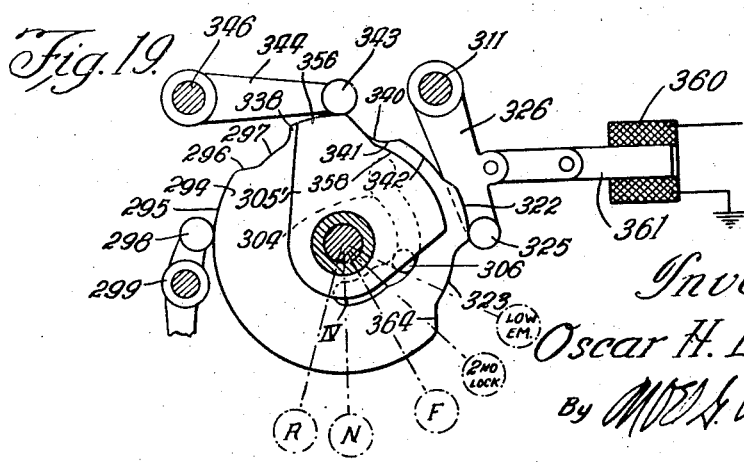
Inventor:
Oscar H. Banker
By [signature] Att'y

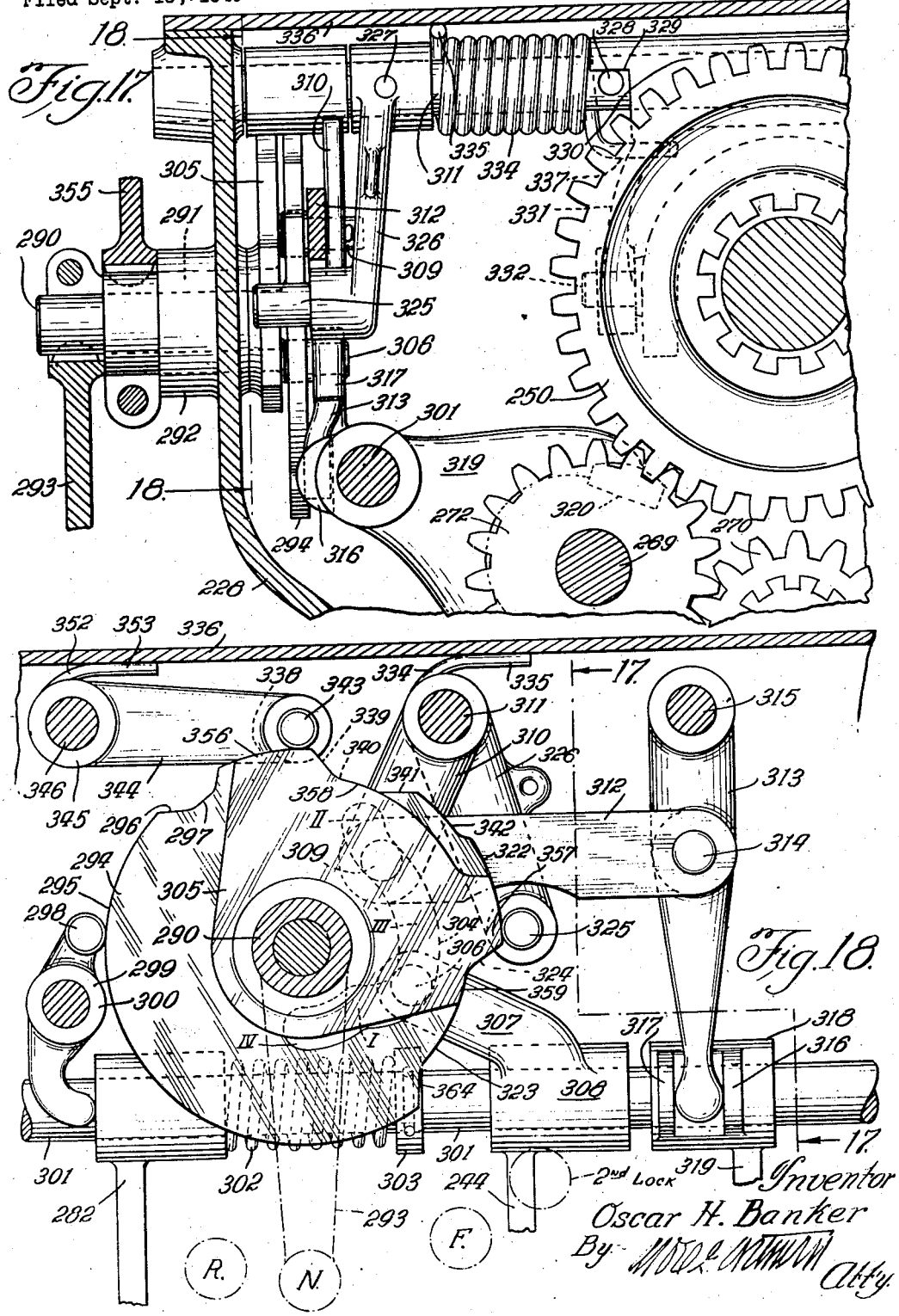

Patented Sept. 21, 1948

2,449,964

UNITED STATES PATENT OFFICE 2,449,964

AUTOMATIC CHANGE-SPEED TRANSMISSION

Oscar H. Banker, Chicago, Ill., assignor to New Products Corporation, Chicago, Ill., a corporation of Delaware Application September 19, 1940, Serial No. 357,388

32 Claims. (Cl. 74—336)

This invention has to do with a change-speed transmission of the type suitable for use upon motor driven vehicles although its use is not necessarily restricted to this field.

The objects of the present invention include the provision of:

An improved compact change-speed transmission having a plurality of speed ratio ranges in each of which the change of ratio is automatically effected, and manually actuated control means for determining the automatic range in which the transmission shall operate.

A transmission as the aforesaid in which the manual supervision is optionally actuatable cooperably with the automatic control to cause successive establishment of power trains between driving and driven members in the order of their power transmitting ratio or in other selected order for either increasing or decreasing the ratio of the power transmitting connection.

A transmission in which optional power trains are selectively established in driving relation by the meshing of driving and driven components of overrunning jaw clutches respectively pertaining to such power trains upon deceleration of the drive shaft sufficiently to incur synchronization of mated driving and driven components, and manually controlled means for conditioning said clutches to predetermine which shall mesh upon synchronization of its components.

An improved transmission combining in a single gear box a simplified unitary structure enabling a vehicle operator to conveniently establish the customary driving ratios and to additionally establish a driving ratio corresponding to "overdrive" in the conventional manner of permitting momentary deceleration of the transmission drive shaft.

A transmission having a one-way drive device in series with a low speed power train to enable the establishment of higher speed power trains without demobilization of the low speed train, and lockout means for the one-way-drive device for preventing automatic establishment of a higher speed train.

Change-speed transmission gearing in which the direction of power transmission between meshed gears required for certain power trains is reversible to avail additional power trains.

A new control means normally settable to predetermine which of selective power trains shall become effective upon a subsequent automatic shifting action.

A novel central control means settable in a series of successive positions for respectively establishing a reverse drive power train, for determining which of the automatic ranges in which the transmission shall be mobilized, and for effecting the aforesaid one-way-drive device lockout means while the reverse power train is established and during mobilization for one of said ranges.

New thrust bearing means for a helical gear journalled on one shaft and clutchable to a coaxial shaft and having axial thrusts imparted thereto in opposite directions respectively when driving and when being driven by a gear with which it is meshed.

Improved means operable at any time under the instant control of the operator for disconnecting the higher speed power train of either automatic range of the transmission.

A new change-speed transmission operable to automatically change from a lower to a higher speed power train while skipping an intermediate speed train but controllable to facilitate a manual change at will from the higher of said trains to the intermediate thereof.

A change-speed transmission embodying four forward speed power trains and including controls enabling automatic shifting between the second and fourth trains and manual shifting at will from the fourth to the third train or from any of the higher of such trains to the first train.

Additional objects will become apparent from the appended claims and upon reading the following description with reference to the annexed drawing, wherein:

Fig. 5 is a side elevational view taken on the line 5—5 of Fig. 2;

Fig. 5a is a fragmentary sectional view illustrating a throttle control pedal and diagrammatically represented electric toggle switch controlled thereby;

Fig. 6 is a fragmentary view illustrating a manually settable control cam occupying the position for establishing the reverse power train of the transmission;

Fig. 7 shows the control cam set to condition the transmission for operation in the speed range involving first and third speeds;

Fig. 8 shows the control cam set to condition the transmission for operation in the speed range involving second and fourth speeds;

Fig. 9 shows the control cam set to condition the transmission in the manner described with respect to Fig. 8, and further for actuating a lockout for a one-way-drive device which is in series with the first and second speed power trains;

Fig. 10 is a view similar to Fig. 1 but illustrating a modified form of transmission constructed according to the principles of the invention;

Fig. 11 is a side elevational view of the control cam for the power trains of the modified transmission, said cam being shown in the neutral position which corresponds to the position of the corresponding cam illustrated in Fig. 3;

Figure 1:
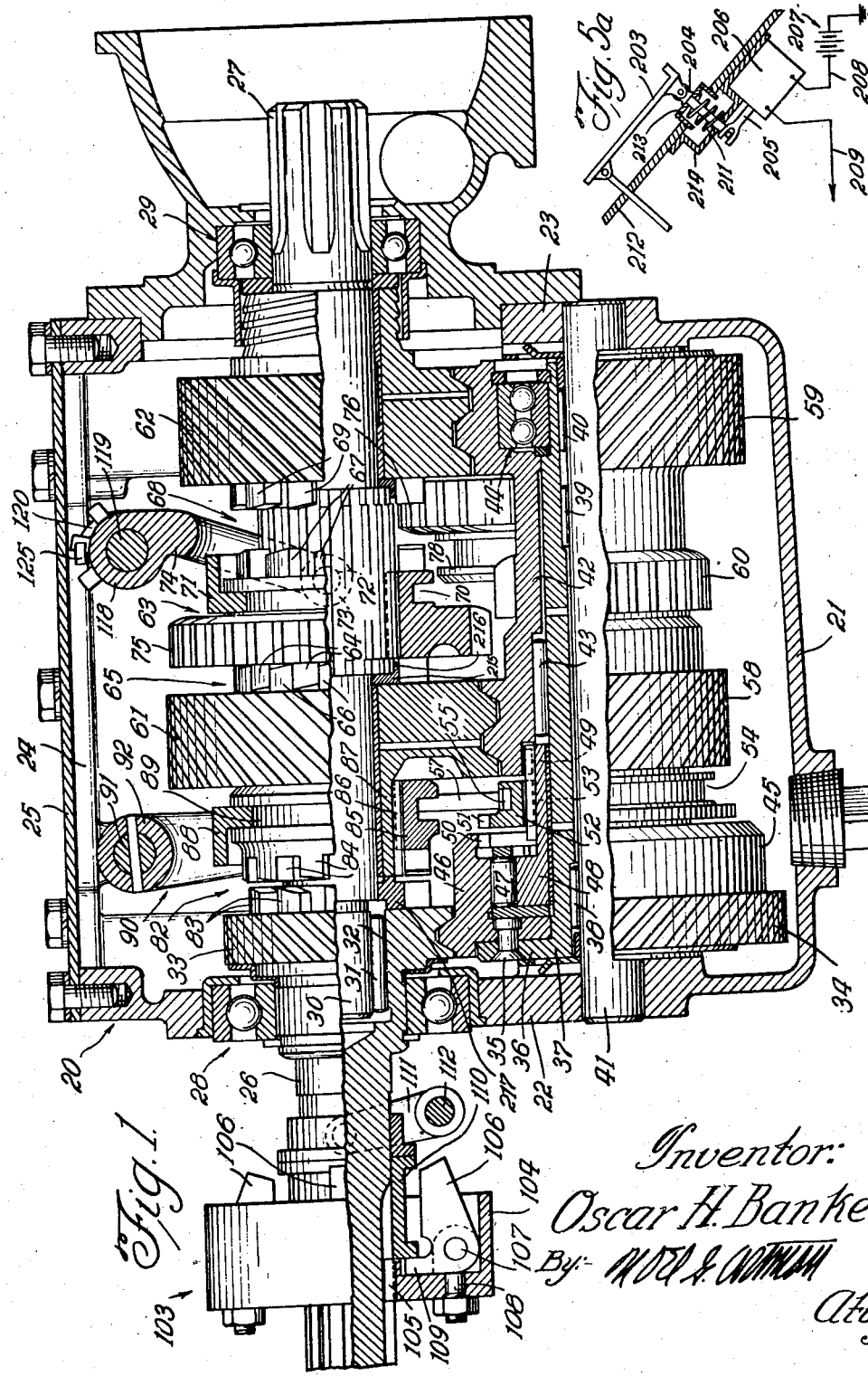
Fig. 1 is a vertical view partly in section and taken axially through a change-speed transmission embodying one form of the invention.

Figs. 12, 13, 14 and 15 correspond respectively to Figs. 6, 7, 8 and 9 but illustrate the various positions of the control cam for the modified transmission;

Fig. 16 is a view similar to Fig. 1 but illustrating a second modification;

Fig. 17 is a transverse sectional view taken as indicated by the lines 17—17 in Figs. 16 and 18;

Fig. 18 is a fragmentary view taken partly in section on the line 18—18 in Fig. 17; and Fig. 19 is a view similar to Fig. 18 but with a modified form of speed controlled cam and with parts omitted for clarity.

Referring now to the drawings, the embodiment shown in Figs. 1 to 9 inclusive will be described first. The transmission shown in these figures is enclosed in a gear box 20 having a bottom wall 21, front and back end walls 22 and 23 and a top opening 24 normally closed by a cover plate 25.

Coaxial drive and driven shafts 26 and 27 are respectively journalled in bearings generally designated 28 and 29 and carried in the front and back walls 22 and 23. As is customary in the art, a reduced front end section 30 of the driven shaft is piloted upon needle bearings 31 within a recessed bearing section 32 in the back end of the drive shaft 26. A gear 33 which is integral with the enlarged back end of the drive shaft 26 constantly meshes with a countershaft gear 34 which, by means of a plurality of standard fastening means such as rivets 35, is secured to a flange 36 upon the left end of a long sleeve 37 which is journalled upon sets of needle bearings 38, 39 and 40 rotatable about the periphery of a rod 41 fixed in the front and back walls of the gear box. A journalled association is established between the sleeve 37 for the countershaft gear 34 and a countershaft 42 by a set of needle bearings 43 and a ball bearing unit generally designated 44.

Normally a one-way-drive connection is established between the countershaft gear 34 and the countershaft 42 by means of an overrunning clutch device 45 of well-known construction, the device comprising an outer friction ring driving member 46 integral with the gear 34, a plurality of clutch rollers 47, and an internal actuating member 48 which is provided with a plurality of radially projecting cam sections (not shown) of the usual type for forcing the rollers 47 into wedging relation against the smooth annular inner periphery of the member 46 when rotative force is applied to the member 46 tending to rotate it in one direction relatively to the actuator member 48 whereby said actuator member is caused to rotate with the member 46 and for releasing the rollers 47 from such wedged relation to permit relative rotative movement between the members 46 and 48 in the opposite direction. In the present instance the construction and arrangement of the overrunning clutch device 45 is such that when the drive shaft 26 is rotated clockwise, as viewed from its left end, for imparting clockwise movement to the gear 33 and counterclockwise rotation to the gear 34 and the driving ring 46 the rollers 47 will be caused to be wedged against said ring and the actuator member 48 caused to rotate with said ring. Rotative movement is imparted from the actuator or driven member 48 of the overrunning clutch 45 to the countershaft 42 through a splined connection generally designated 49.

At times in the operation of the transmission, as explained hereinafter, it will be desirable to lock out the overrunning clutch 45 for establishing a two-way-drive connection between the gear 34 and the counter-shaft 42, and this is accomplished by means of internal jaw clutch teeth 50 and cooperable external jaw clutch teeth 51 upon a ring 52 which is internally splined at 53 to an extension of the actuator member 48. The ring 52 is provided with a groove 54 for receiving shoes 55 and 56 upon a shifter fork 57, Figs. 1 and 3, by means of which the ring 52 is slidable axially to the left for meshing the teeth 50 and 51. When the teeth 50 and 51 are thus meshed the gear 34 is connected with the countershaft 42 in two-way-driving relation through said teeth 50 and 51 and the splined connections 53 and 49.

First and second speed connections through the transmission which has four forward speeds, are obtained respectively through gears 58 and 59 which are integral with the countershaft 42. A reverse power train employs a gear 60 which is also integral with the countershaft. The countershaft gear 58 drives a gear 61 which is journalled upon the driven shaft 27 whereas the countershaft gear 59 drives a gear 62 which is also journalled upon the driven shaft.

When the countershaft 42 is being rotated from the drive shaft 26 through the power train including the gears 33 and 34, the overrunning clutch 45 and the splined connection 49, due to the ratio of the gears 58 and 61 and of the gears 59 and 62, the gear 61 will be rotated at a slower speed than the gear 62, and these ratios are such that when the driven shaft 27 is connected for rotation with the gear 61 the first speed driving ratio will prevail between the drive shaft 26 and the driven shaft 27, and when the driven shaft 27 is connected for rotation with the gear 62 the second speed driving ratio will prevail between the drive shaft 26 and the driven shaft 27. Means for selectively connecting the gears 61 and 62 with the driven shaft 27 includes a member 63 which is splined to the driven shaft 27 and slidable axially thereon. The left face of the member 63 carries a series of jaw clutch teeth 64 which constitute the right-hand counterpart of an overrunning jaw clutch 65 of which the left-hand counterpart consists of complemental jaw clutch teeth 66 on the gear 61. In Fig. 1 it will be seen that the end faces of the teeth 64 and 66 are bevelled to enable the member 63 to be moved to the left for pressing the ends of the teeth 64 against the ends of the teeth 66 in ratcheting relation without clashing while said member 63 is rotating faster than the gear 61. Such bevelling of the teeth 64 and 66 is utilized in establishing the third speed power train as will be explained presently.

The member 63 carries upon its right end a series of clutch teeth 67 which constitute the left-hand counterpart of an overrunning jaw clutch 68 of which the right-hand counterpart is formed of jaw clutch teeth 69 which project axially from the left face of the gear 62. In the case of the clutch 68 it will be observed in Fig. 1 that the end faces of the teeth 67 and 69 are so bevelled that the member 63 may be shifted to the right for pressing the ends of these teeth in noiseless ratcheting relation while the gear 62 is rotating clockwise relative to said member 63. The splined member 63 is provided with a groove 70 for receiving a shifter shoe 71 which is pivotally connected by trunnions 72 at diametrically opposite of its sides with end bearings 73 carried by the bifurcations of a shifter fork 74. It is by means of this shifter fork that the member 63 is slid axially to the right or left for respectively meshing the teeth of the overrunning jaw clutches 68 or 65.

It will be understood that synchronizer devices of the blocker or other type may be used in conjunction with the overrunning jaw clutches herein shown or ordinary jaw clutches may be substituted with such synchronizer devices, but the jaw clutches shown operate satisfactorily and are less expensive.

Figure 3:
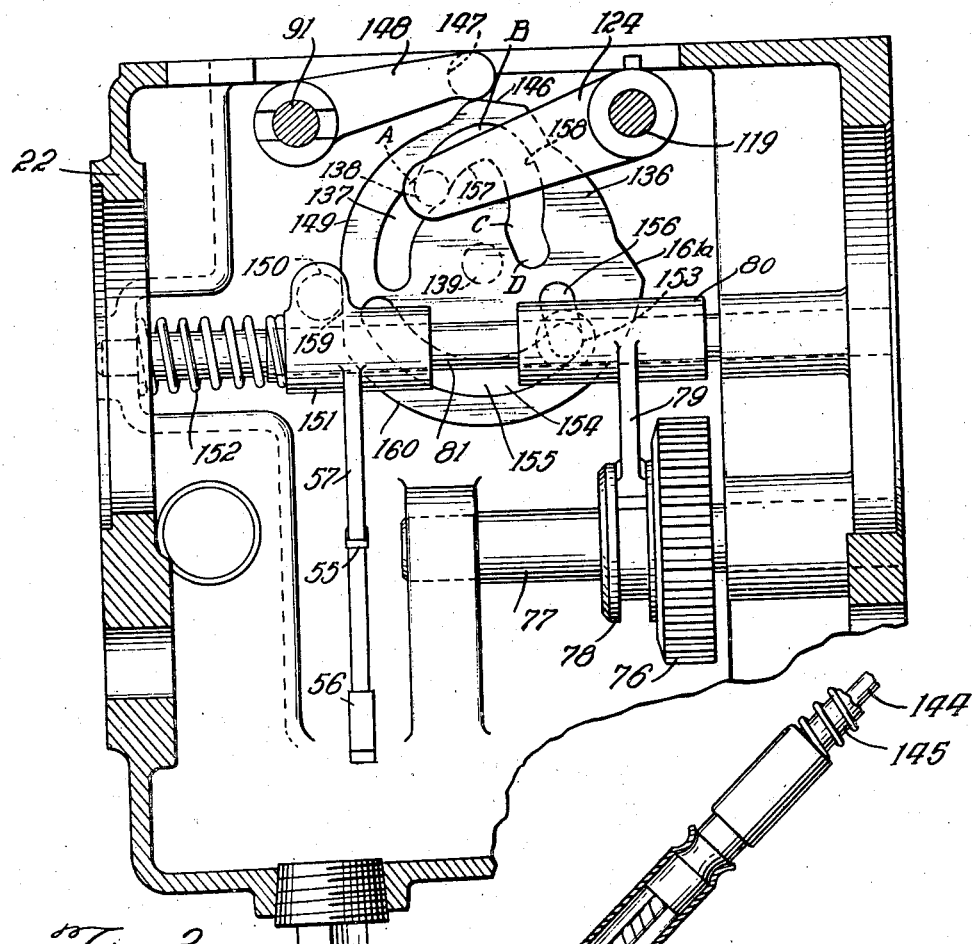
Fig. 3 is a sectional view taken substantially upon the line 3—3 of Fig. 2.
Figure 4:
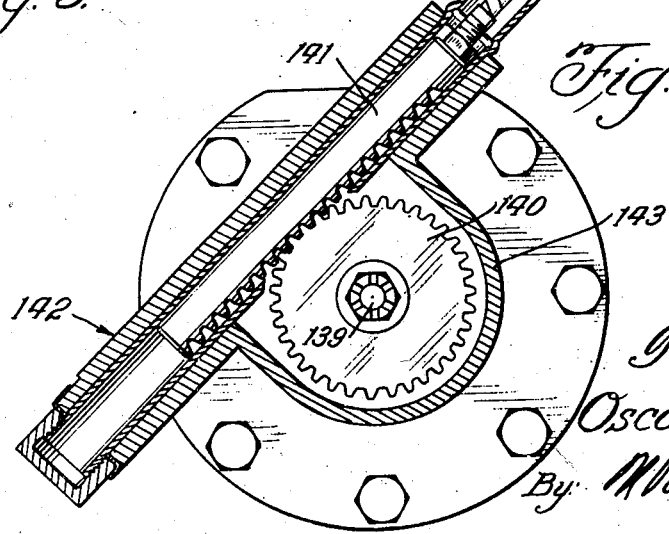
Fig. 4 is a sectional view taken substantially on the line 4—4 of Fig. 2.

Attention is also directed at this time to a gear 75 which is integral with the splined member 63 and which is aligned in a common plane with the countershaft reverse gear 60 when the splined member 63 is in the neutral position wherein neither clutch 65 nor 68 is engaged. When the member 63 is in this neutral position and the gears 60 and 75 are thus aligned, the reverse power train may be established by sliding a reverse idler gear 76, Figs. 1 and 3, axially into mutual mesh with the gears 60 and 75. In Fig. 3 the reverse idler gear 76 is shown mounted upon a bearing rod 77 and has an integral collar 78 which is engaged by a shifter fork 79 of which the hub 80 is slidably mounted upon a shifter fork rod 81 having its opposite ends mounted in sections of the two gear box end walls 22 and 23. The manner in which the shifter fork 79 is actuated for controlling the axial position of the reverse idler gear 76 will be explained presently.

Third and fourth speeds are obtained by power trains including an overrunning jaw clutch 82 having a left-hand counterpart comprising teeth 83 extending axially from the drive shaft 26 and a right-hand counterpart comprising teeth 84 extending axially to the left from a ring 85 which is splined at 86 to a hub extension 87 of the gear 61. The end faces of the clutch teeth 83 and 84 are bevelled in a manner to permit movement of the teeth 84 endwise against the teeth 83 in noiseless ratcheting relation while the gear 33 is rotating clockwise relatively to the gear 61 and hence the ring 85. Such bevelling of the teeth 83 and 84 facilitates engagement of the clutch 82 by speed controlled means, which, upon attainment of a predetermined speed of the drive shaft 26, provides for the ring 85 being yieldably urged to the left so that establishment of a higher speed power train will be effected upon momentary deceleration of said drive shaft for synchronizing the teeth 83 with the teeth 84 whereby the teeth 84 are forced into mesh with the teeth 83 for effectuating the higher speed train.

Axial movement of the ring 85 is had by means of a shoe 88 of which a flange rides in a groove 89 of said ring and a shifter fork 90 of which the lower ends of the legs have a trunnion-bearing connection with the shoe 88 similar to the connection 72—73 shown with respect to the shifter fork 74.

Before describing the speed controlled means for actuating the shifter fork 90 and thus controlling the clutch 82, it will be explained how the third and fourth speed power trains are established by means of the clutches 82, 65 and 68. As previously explained, when the countershaft 42 is being driven from the drive shaft 26 through the overrunning clutch 45 the gear 58 drives the gear 61 at low speed with respect to the shaft 26 while the gear 59 drives the gear 62 at second speed with respect to the shaft 26, so that if the clutch 65 is closed while the clutch 82 is disengaged the driven shaft 27 will be driven at low or first speed whereas if the clutch 68 is closed while the clutch 82 is disengaged the driven shaft 27 will be connected with the gear 62 and driven at the second speed. Third speed is obtained by effecting concurrent closing of the clutches 65 and 82 whereby the drive and driven shafts 26 and 27 are directly connected through said clutch 82, the ring 85, splined connection 86, the extended hub 87 of the gear 61, the clutch 65, and the ring member 63 which is splined to the driven shaft. Meanwhile the gear 61 will drive the countershaft gear 58 and the actuator or driven member 48 of the overrunning clutch 45 at an overspeed with respect to the driving member 46 as permitted by the clutch rollers 47. While the gear 58 is thus being driven at the overspeed, since it is of less diameter than the gear 61, the countershaft gear 59 will likewise be driven at the overspeed and the ratios of the gears 61 and 58 and of the gears 59 and 62 are so chosen that the gear 62 will be driven at a selected overdrive ratio with respect to the drive shaft 26. It will be seen, therefore, that if the clutch 68 is closed while the clutch 82 is closed, that the clutch 65 will be open and the driven shaft 27 will be connected for rotation with the gear 62 at an overdrive speed which is the fourth speed for the transmission.

Figure 2:
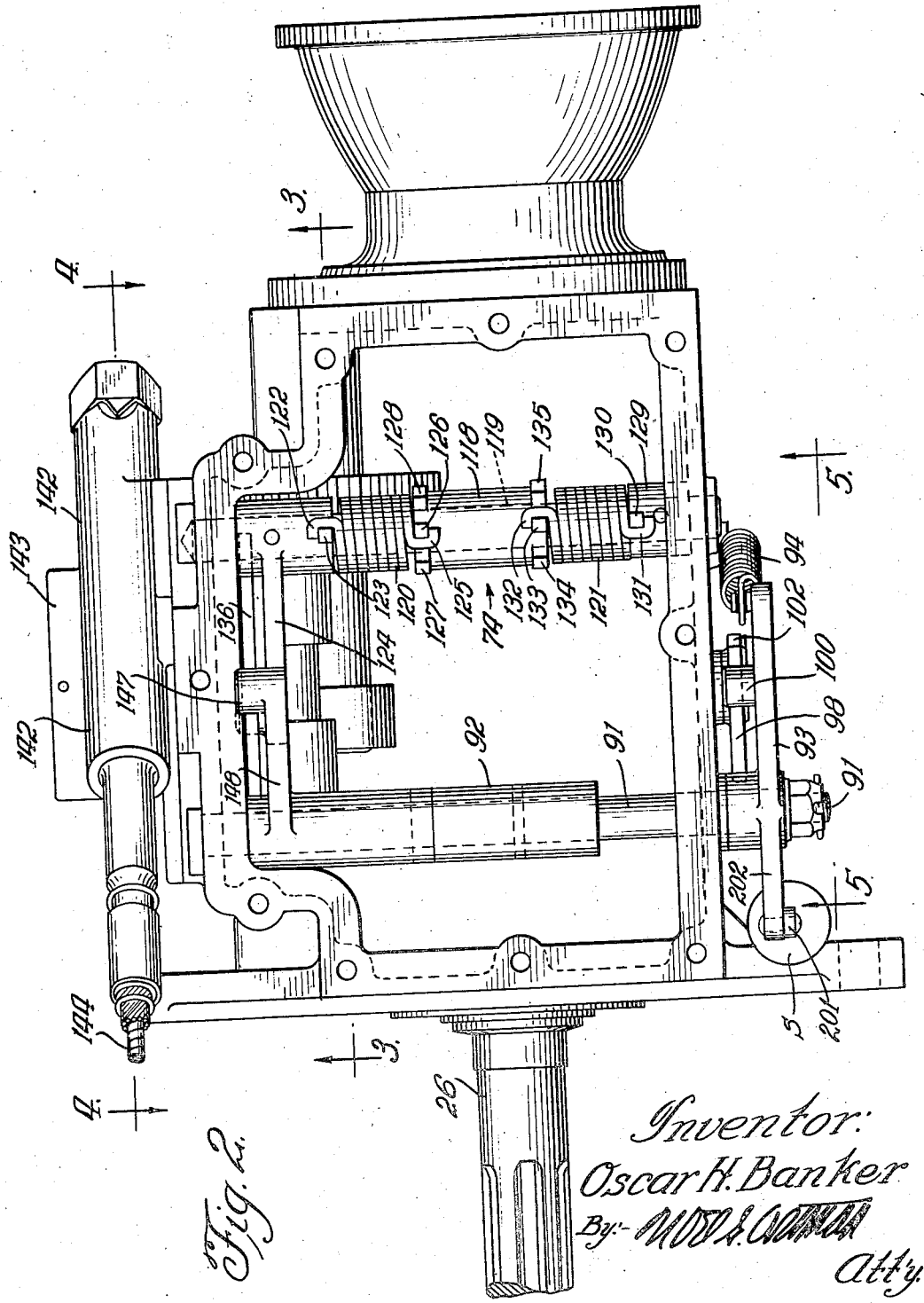
Fig. 2 is a plan view of the transmission shown in Fig. 1.

A cross shaft 91, Figs. 1, 2, 3 and 5, upon which the hub 92 of the shifter fork 90 is fixed, is journalled in the vertical side walls of the gear box. One end of the shaft 91, as shown in Figs. 2 and 5, has fixed thereto an arm 93 upon which a contraction spring 94 constantly exerts a force that when uncontravened is effective for rotating the shaft 91 clockwise as viewed in Figs. 1 and 5. The lower end of the spring 94 is secured to a pin 95 suitably anchored in a side wall of the gear box. A bearing stud 96 projecting outwardly from the gear box side wall rotatively carries the hub 97 of a cam plate 98 in which there is a notch 99 engageable with a stud 100 upon the arm 93 and when the cam plate 98 is disposed with said notch seating the stud 100 as shown in Fig. 5 the arm 93 will be pivoted sufficiently counterclockwise against the force of the spring 94 to place the shifter fork 90 in the position illustrated in Fig. 1 for separating the teeth of jaw clutch 82. However, an arm 101 which is integral with the hub 97, when actuated for rotating the cam plate 98 counter-clockwise will displace the notch 99 from the stud 100 and bring a cam profile section 102 into registry with said stud whereby the spring 94 becomes effective for rotating the arm 93, the shaft 91 and the shifter fork 90 clockwise for yieldably urging the clutch teeth 84 into mesh with the clutch teeth 83. The clutch 82 may be disengaged by clockwise rotation of the cam plate 98 for camming the stud 100 upwardly by means of the cam profile 102 until the notch 99 again registers with said stud.

The position of the cam plate 98 is determined by a speed-responsive device carried upon the drive shaft 26 and generally designated 103 in Fig. 1. This device comprises a housing 104 of which the hub is splined to the drive shaft at 105, inertia weights 106 being pivotally connected to bearing pins 107 carried upon the inner ends of bolts 108 upon the housing and having heel portions 109 which bear against the left end of a sleeve 110 for shifting the same to the right upon the shaft 26 attaining sufficient speed for throwing the weights radially outwardly. Any form of conventional detent (not shown) means may be employed for yieldably resisting movement of the inertia weights from both their inner and outer positions so that they will move quickly between these two positions upon the shaft 26 reaching critical speeds. Therefore, when the shaft 26 reaches a predetermined minimum speed the weights 106 will be thrown quickly outwardly for shifting the sleeve 110 to the right for rotating an arm 111, a transverse shaft 112 to which said arm is fixed and journalled in the bell housing (not shown), the shaft 112 being thus effective for imparting clockwise rotation to an arm 113, Fig. 5, attached to the outer end thereof and hence endwise motion, to the right, of a link 114 which interconnects the ends of the arms 113 and 101. A light spring 115 which has one end attached to the gear box at 116 and its opposite end to the arm 101 at 117 yieldably resists the endwise movement of the link 114 and consequently the outward radial movement of the inertia weights 106. So long, however, as the shaft 26 continues rotating at a speed above a predetermined minimum the centrifugal force of the inertia weights will be sufficient for maintaining the spring 115 extended and for holding the cam plate 98 with the short radius profile section 102 thereof in registry with the stud 100 on the arm 93 to enable the spring 94 to apply effective closing force to the clutch 82.

Disengagement of the clutch 82 is made possible at any time under the control of the operator by mechanism including a solenoid S, Fig. 5, an iron core 200 slidable axially therein, a link 201 pivotally connected at its lower end with said core, and an arm 202 fixed to the shaft 91 and pivotally connected with the upper end of the link 201. Energization of the solenoid causes the core 200 and the link 201 to be urged downwardly with sufficient force to overcome the force of the spring 94 while rotating the shaft 91 counter-clockwise for disengaging the clutch 82. Such disengagement of the clutch 82 is brought about at will for instantaneous shifting from fourth to second speed or from third to first speed, and energization of the solenoid is effected by depressing the heel portion of the accelerator pedal 203, Fig. 5a, which is pivotally anchored in the upper end of a reciprocal bolt 204. The thus lowered bolt 204 pivots a lever 205 of a toggle switch 206 for closing a circuit originating at ground and including a battery 207, a conductor 208, said switch 206, a conductor 209, Figs. 5a and 5, the solenoid S and a conductor 210 back to ground. A compressible spring 211 beneath the floor board 212 bears against a stop member 213 fixed upon the bolt 204 and against a bracket 214 secured to the under side of said board and serves to return the bolt 204 and the heel portion of the pedal 203 to the position shown when the operator relieves them of the aforesaid depressing force, whereupon the switch 206 is opened and the solenoid S deenergized. It will be observed that the bolt 204 may be depressed for effecting the opening of the clutch 82 irrespective of whether the toe portion of the pedal 203 is depressed for opening the vehicle throttle.

The shifter fork 74 for controlling the axial position of the member 63, Fig. 1, which carries counterparts of the overrunning jaw clutches 65 and 68, has its hub 118 rotatively disposed upon a cross-shaft 119, Figs. 1, 2 and 3 of which the opposite ends are journalled in the vertical side walls of the gear box. A pair of helical wind-up springs 120 and 121 serve as means for connecting the shifter fork hub 118 with the shaft 119. It will be seen in Fig. 2 that one end of the spring 120 is provided with a hook 122 which engages a stud 123 upon the hub of an arm 124 which is rotatively fixed to the shaft 119 for imparting operative movement thereto. Thus when the arm 124 is rotated clockwise as viewed in Fig. 3, the shaft 119 will be rotated clockwise, and incident to such clockwise rotation of the arm 124 the stud 123 will impart a clockwise winding motion to the outer end of the spring 120 as this spring would be viewed from its inner end. This winding up of the spring 120 causes the hook 125 at its inner end to apply force to a stud 126 upon the hub of the shifter fork 74 for urging this shifter fork to rotate clockwise for pressing the end faces of the teeth 64 against the end faces of the teeth 66 of the clutch 65, the spring 120 being wound sufficiently to force the teeth 64 into mesh with said teeth 66 when the member 63 and the gear 61 are synchronized. The tension of the spring 120 for forcing the member 63 to the left may be increased by placing the hook 125 about a stud 127 on the shifter fork hub 118, or, the tension of the spring 120 may be decreased by associating the hook 125 with the stud 128. When the arm 124 is rotated counter-clockwise, corresponding rotation is imparted to the shaft 119 and a collar 129 which is fixed to said shaft. A stud 130 on the collar 129 thereby becomes effective while coacting with a hook 131 upon the outer end of the spring 121 for winding up this spring while a hook 132 at the inner end thereof bears against the stud 133 upon the shifter fork hub 118. In this manner the spring 121 is energized for urging the end faces of the teeth in the clutch 68 together and for sliding the teeth 67 into mesh with the teeth 69 upon synchronization of the clutch counterparts. The force with which these clutch teeth are urged into mesh may be regulated by attaching the hook 132 of the spring 121 with either of the studs 134 and 135 which have different positions circumferentially of the shifter fork 118.

Operative movement of the arm 124 and of the shaft 119 is accomplished and controlled by a cam plate 136 which has a slot 137 in which there is disposed a stud 138 carried by said arm 124. This cam plate 136 is carried upon a shaft 139, Figs. 3 and 4, which also carries a pinion 140 that meshes with a rack 141 encased within a sleeve generally designated 142 and comprising a part of a housing 143 which is secured to the outer side of a side wall of the gear box. Means for moving the rack 141 endwise in either direction may be in the form of a flexible cable 144 disposed within a sheath 145. One end of the cable 144 will extend into the driver's compartment of a motor driven vehicle upon which the transmission may be installed and within convenient reach for manual manipulation by an operator.

The various camming profiles upon the cam plate 136 will be pointed out and explained in the ensuing description of operation.

First typical operation of the transmission

It will be assumed that a vehicle upon which the transmission is installed stands at rest with the transmission in the neutral position illustrated in Figs. 3 and 5. The splined member 63 in Fig. 1 will then be at its mid-position with the gear 75 aligned with the gear 60 and with the clutches 65 and 68 disengaged. While the transmission is in this neutral condition a lobe 146 upon the cam 136 is disposed beneath a stud 147 upon the end of an arm 148 of which the hub is fixed upon the cross shaft 91 and thereby maintaining the shifter fork 90 pivoted counter-clockwise as viewed in Fig. 1 for holding the clutch 82 disengaged. Also at this time a short radius section 149 of the cam plate 136 is in registry with a stud 150 upon the hub 151 of the shifter fork 57 and said section 149 is of sufficiently short radius to permit a spring 152 to slide the shifter fork 57 far enough rearwardly or to the right as viewed in Fig. 3 for disengaging the clutch 50—51 in Fig. 1. It will be further noted, while the control cam 136 is in the neutral position, that a stud 153 projecting outwardly from the hub 80 of the reverse shifter fork 79 is maintained in the position shown in Fig. 3 by a reverse cam slot 154 which has a long arcuate leg 155 and a short spur leg 156. When the pin 153 is in this position the shifter fork 79 is disposed rearwardly for holding the reverse idler gear 76 to the rear of and out of mesh with the reverse train gears 75 and 60.

In conditioning the transmission for forward movement in first speed the operator will exert a tensile force upon the cable 144 whereby the rack 141 will be pulled upwardly for rotating the pinion 140 sufficiently to cause the cam plate 136 to be rotated counter-clockwise from the position shown in Fig. 3 to the position shown in Fig. 7 with slot portion A displaced from the stud 138 and slot portion B at said stud. During such rotation of the cam plate 136 the section 157 of its camming slot 137 displaces the stud 138 upwardly for rotating the arm 124 and the cross shaft 119 clockwise, Figs. 1 and 3, whereby force is transmitted through the spring 120 for rotating the shifter fork 74 with the shaft 119. Thus the splined member 63 is shifted forwardly and if the teeth 64 should then be aligned with the spaces between the teeth 66 this rotation of the shifter fork 74 will be sufficient for engaging clutch 65. If, on the other hand, the teeth 64 should be disaligned with the spaces between the teeth 66, the member 63 will be restrained from further axial movement when the bevelled end faces of these sets of teeth engage whereupon the shifter fork 74 will cease rotating and the spring 120 will be wound up as the shaft 119 completes its rotative movement. In this manner the spring 120 is energized for meshing the clutch teeth upon subsequent relative rotation of the member 63 and the gear 61.

While the cam plate 136 was rotating from the position shown in Fig. 3 to the position shown in Fig. 7 the reverse shifter fork 79 remained in the position shown in Fig. 3 while the arcuate portion 155 of the cam slot 154 idly received the stud 153. Likewise, the short radius section 149 of the cam plate passed idly along the stud 150 to leave the disengaged jaw clutch 50—51 undisturbed.

With the cam plate 136 set as shown in Fig. 7 the operator will accelerate the vehicle engine in the normal manner for starting and if the vehicle is equipped with a manually operated clutch for connecting the engine crank-shaft with the transmission drive-shaft 26 the operator will then cause engagement of this clutch, or, if the vehicle should be equipped with an automatic clutch as that shown in U. S. Patent No. 2,042,454, which engages upon the engine crankshaft attaining a predetermined minimum speed, the operator will simply open the engine throttle to cause engagement of the clutch. When the clutch engages, the gear 33 will be rotated clockwise as viewed from the front or left end of the transmission in Fig. 1 whereby the countershaft gear 34 will be rotated counter-clockwise. The first speed power train which includes the serial connection of said gears 33 and 34, the overrunning clutch 45, the splined connection 49, gears 58 and 61, the clutch 65, splined member 63 and the driven shaft 27, will then begin operation.

After the vehicle has gotten under way the operator may provide for interposition of the second speed power train between the drive and driven shafts by exerting an additional pull upon the cable 144 to advance the cam plate 136 into the position shown in Fig. 8 with slot portion C receiving the stud 138. During this rotation of the cam 136 the edge section 158 of the cam slot 137 will cam the stud 138 downwardly for rotating the arm 124 and the shaft 119 counter-clockwise. This rotation of the arm 124 and of the shaft 119 will normally be incurred during power transmission through the established power train wherefore the frictional engagement of the teeth in the clutch 65 prevents immediate separation of the clutch counterparts so that pursuant to such manual setting of the cam plate the spring 121 will be wound up. Thus the setting of the cam plate amounts to a preselection of the next power train and the shift to this train is initiated by momentary closing of the engine throttle whereby the frictional engagement of the counterparts in the clutch 65 is relieved to enable the wound-up spring 121 to rotate the shifter fork 74 counter-clockwise for sliding the member 63 rearwardly incident to disconnecting the first speed power train and pressing the teeth 67 against the teeth 69, and since the gear 62 is then rotating at greater speed than the driven shaft 27 and the splined member 63 the teeth 69 will ratchet over the teeth 67 until such time as the vehicle engine decelerates sufficiently for the gear 62 to synchronize with said member 63 whereupon the energized spring 121 will force the teeth 67 into mesh with the teeth 69.

While the cam 136 is in the second and fourth speed positions a part of the circular cam section 149 will remain engaged with the stud 150 associated with the shifter fork 57 wherefore the spring 152 remains effective for holding this shifter fork in the position corresponding to the disengaged condition of the lockout clutch 50—51, Fig. 1. It will also be observed that the arcuate leg 155 of the slot 154 is sufficiently long to have moved idly past the stud 153 associated with the reverse shifter fork while the cam 136 was moved from the position shown in Fig. 7 to the position shown in Fig. 8.

In shifting from second to the third speed in which the drive shaft 26 and the driven shaft 27 are connected directly together, the operator will preselect this shift by applying force to the control cable 144 for rotating the cam plate 136 clockwise to the position illustrated in Fig. 7, thereby causing rotation of the cross shaft 119 clockwise for transmitting force through the spring 120 to the shifter fork 74. However, until the operator closes the engine throttle the frictional engagement of the counterparts in the clutch 68 will prevent their separation so the spring 120 will be wound up. But when the throttle is later closed to initiate the shift this frictional engagement terminates and the spring is then operable to slide the member 63 forwardly incident to disconnecting the second speed power train and pressing the ends of the teeth 64 against the ends of the teeth 66 in ratcheting relation inasmuch as the driven shaft and the splined member 63 are at this time rotating faster than the gear 61. The shift into the third speed connection is not attempted until after the vehicle has attained a predetermined minimum speed at which time the drive shaft 26 will be rotating sufficiently fast to have thrown the inertia weights 106 outwardly for shifting the sleeve 110 to the right whereby the arm 111, the shaft 112 and the arm 113, Fig. 5, will have been rotated clockwise and the cam plate 98 will have been rotated counter-clockwise for bringing the short radius cam section 102 beneath the stud 100 on the arm 93 to enable the spring 94 to have rotated the arm 93 and the cross shaft 91 clockwise, such clockwise rotation of the shaft 91 being possible since the lobe 146 on the cam plate 136, Figs. 7 and 8, is at this time removed from the stud 147 on the arm 148. Thus at the time the cam plate 136 is rotated from the position shown in Fig. 8 to the position shown in Fig. 7 the spring 94 will be causing the clutch teeth 84 to be pressed yieldingly against the ends of the clutch teeth 83 while the latter are ratcheting over the former since the drive shaft rotates faster than the driven shaft during the second speed connection. Therefore, incident to the shift from second to third speeds and while the drive shaft 26 is decelerating with the engine of which the throttle has been momentarily closed, the teeth 64 will be ratcheting over the teeth 66 while the teeth 83 are ratcheting over the teeth 84 although initially the relative movement between the teeth 83 and 84 will be greater than that between the teeth 64 and 66 because the splined member 63 is rotating with the driven shaft 27 and the teeth 83 are rotating with the drive shaft 26. Inasmuch as the splined member 63 continues rotation with the driven shaft 27 at substantially constant speed and since the gear 61 has no positive drive connection at this time for accelerating its speed to that of the driven member 63 the clutch teeth 64 and 66 continue ratcheting. Meanwhile, the drive shaft 26 and the gear 33 decelerate with the engine until the teeth 83 reach synchronism with the teeth 84 whereupon the spring 94, Fig. 5, will slide the teeth 84 into mesh with the teeth 83 and thereby connect the driving shaft 26 directly with the gear 61 through the clutch 82 and the splined connection 86 between the ring member 85 and the hub extension 87 of said gear 61. The frictional engagement of the driven shaft 27 with the gear 61 and its hub 87 together with the impositive rotative force applied to the gear 61 by the ratcheting of the teeth 64 over the teeth 66 resist deceleration of the gear 61 during the aforesaid deceleration of the drive shaft 26, and since the gear 61 is connected with the driven member 48 of the overrunning clutch 45, such driven member overruns the clutch driving ring 46 as permitted by the clutch rollers 47 while said ring and the gears 34 and 33 decelerate with the shaft 26. This overrunning relation between the driving and driven parts 46 and 48 of the overrunning clutch 45 continues subsequent to engagement of the clutch 82 for driving the gear 61 directly from the shaft 26, and upon subsequent acceleration of the engine the gear 61 will be accelerated to the speed of the driven shaft and the splined member 63 thereon whereupon the counterparts of the clutch 65 will synchronize and this clutch engage as the member 63 is slid axially forwardly by the force of the energized spring 120. The third speed power train is then established.

Although an independent speed responsive device 103 is here shown it will be understood that this device could be part of a speed responsive clutch as illustrated in my copending application Ser. No. 164,025, which has eventuated in Patent No. 2,237,297, dated April 8, 1941, and that the manual means shown in said application for predominating over said speed responsive part of the clutch in releasing at will the jaw clutch controlled thereby could also be incorporated in the present structure for manual release of the clutch 82.

While the drive and driven shafts 26 and 27 are thus connected directly through the third speed power train comprising the clutches 82 and 65, the gear 62 will be driven at an overspeed through the fourth speed power train comprising the gears 61 and 58, the countershaft 42 and the gear 59. This fourth or overdrive power train is preselected by the operator applying force through the cable 144 for again rotating the cam plate 136 into the position illustrated in Fig. 8 whereby the spring 121 is again energized as aforesaid for transmitting rotative force from the cross shaft 119 to the shifter fork 74 to slide the member 63 rearwardly for engaging the ends of the teeth 67 and 69 upon momentary closing of the engine throttle. After the engine decelerates sufficiently for the gear 62 to reach synchronism with the driven shaft 27 and the member 63 the energized spring 121 is effective for sliding said member 63 rearwardly as the teeth 67 are meshed with the teeth 69. At this time the fourth speed or overdrive power train will be established.

While power is transmitted between the gears 61 and 58 the helical teeth thereon will effect a camming action urging these gears axially, and the slant of said teeth is so chosen that when power is transmitted from the gear 61 to the gear 58, while the fourth or overdrive train is established, the gear 61 will be urged forwardly, and that when power is transmitted from the gear 58 to the gear 61, while the first speed power train is established, the gear 61 will be urged rearwardly. Such rearward thrust of the gear 61 is opposed by a thrust ring 215 while bearing against a shoulder 216 of the driven shaft whereas the forward thrust of the gear 61 is resisted by a thrust ring 217 which is freely rotatable upon the driven shaft 27 at a position between the gear hub 87 and the back end of the drive shaft 26. It will be recalled that during operation in the first speed power train the clutch 65 is engaged whereby the gear 61 is non-rotatively connected with the driven shaft wherefore no rotative movement occurs relatively to said gear 61 and the thrust ring 215 while the latter absorbs the thrust of the former and consequently no heat will be generated by friction between these parts. The thrust ring 217 functions similarly during operation of the fourth speed power train. Since the clutch 82 is connected at this time the gear 61 and its hub 87 rotate in unison with the drive shaft 26, and hence no relative rotation occurs between the thrust ring 217 and the hub 87 during pressure between these parts. Thus the structure avoids frictional heat which would shorten the effective life of the ring. If, on the other hand, a conventional snap ring were installed within a groove circumscribing the driven shaft 27 adjacently to the front end of the gear hub 87, there would be relative rotation between this snap ring and said gear hub during fourth speed operation because the driven shaft is then rotating at an overspeed relatively to the gear 61 and its hub.

Should the operator wish to change from the fourth speed power train to the third speed power train, he may do so by operating the cable 144 for rotating the cam plate 136 into the position shown in Fig. 7 and momentarily closing the engine throttle to enable the spring 120 to disengage the clutch 68 and place the counterparts of the clutch 65 in ratcheting relation. Thereafter by opening the throttle and thus accelerating the chaft 26 and the gear 61 directly connected therewith, said gear 61 will reach synchronism with said member 63 whereupon the spring 120 will cause the clutch 65 to engage.

While operating in third speed the operator may shift to the second speed power train by actuating the cable 144 for rotating the cam plate 136 into the position shown in Fig. 8, closing the engine throttle to enable the spring 121 to bring the teeth of the clutch 68 into ratcheting relation, depressing the heel portion of the accelerator pedal to cause energization of the solenoid S, Fig. 5, and disengagement of the clutch 82, and opening the throttle to pick up the drive through the second speed power train including the overrunning clutch 45 upon slowing of the gear 62 to synchronism with the driven shaft and engagement of the clutch 68 under the force of the spring 121. After establishment of the second speed, when the clutch teeth 83 will be rotating faster than the teeth 84, the heel portion of the accelerator pedal may be released to again place the clutch 82 under control of the governor 103 and the spring 94.

Shifting downwardly from second speed to first speed is accomplished by a manual shift operation for rotating the cam plate 136 to the first speed position shown in Fig. 7 and subsequently momentarily closing of the engine throttle whereby the spring 120, energized by the aforesaid manual shift operation, is effective for engaging the clutch 65 when the engine is later accelerated for speeding up the gear 61 for synchronization with the splined member 63.

Attention is directed to the fact that the transmission may be placed in neutral at any time by manipulation of the cable 144 to rotate the cam plate 136 into the neutral position shown in Fig. 3 and closing of the engine throttle to thus provide for the interruption of all forward power trains by the disengagement of the clutches 65 and 68 and the interruption of the reverse power train by positioning the reverse idler gear 76 rearwardly of the reverse gears 60 and 75.

Conversion of the second speed power train into a two-way-drive train is provided for by the clutch 50—51 which is engaged when the cam plate 136 is rotated from the position shown in Fig. 8 to the position shown in Fig. 9 whereby the camming edge section 161 is passed along the stud 150 for shifting the shifter fork 57 and the clutch ring 52, Fig. 1, to the left. Slot portion D receives the stud 138 at this time without rotation having been imparted to the arm 124, and the rise 161a is positioned to pass beneath the stud 147 slightly prior to the rise 161 passing beneath the stud 150 to insure disengagement of the clutch 82 prior to meshing of the teeth of said lockout clutch 50—51. With the overrunning clutch 45 shunted out of operation in this manner the vehicle can be braked by the engine when descending long slopes or in any instance where it is advantageous to so employ the engine for holding the vehicle under close supervision.

*Second typical operation of the transmission*

The transmission is operable to effect an automatic shift from the first speed power train to the direct or third speed power train. In bringing about such operation of the transmission the operator will rotate the cam plate 136 into the position illustrated in Fig. 7 in the manner hereinabove described for engaging the clutch 65. The vehicle will then be started forwardly through the first speed power train which includes the gears 33 and 34, overrunning clutch 45, the gears 58 and 61, said clutch 65 and the member 63 which is splined to the driven shaft 27. When the vehicle attains a predetermined minimum speed at which the intertia weights 106 are thrown outwardly to enable the spring 94, Fig. 5, to rotate the shifter fork 90 for pressing the clutch teeth 84 into ratcheting relation with the clutch teeth 83, the operator may bring about an automatic shift for establishing the third speed power train and this is done by momentarily closing the engine throttle to cause deceleration of the teeth 83 relatively to the teeth 84 while the teeth 84 continue rotation at substantially constant speed with the driven shaft 27 whereby the spring 94 will cause engagement of the clutch 82 upon the attainment of synchronism of said teeth 83 with said teeth 84. Upon this closing of the clutch 82 the drive and driven shafts 26 and 27 will be coupled for rotation in a one to one ratio while the driven member 48 of the overrunning clutch is driven through the gears 61 and 58 at an overspeed with respect to the overrunning clutch driving ring 46.

By leaving the cam plate 136 in the position shown in Fig. 7 for establishing engagement of the clutch 65 the transmission will operate as a two speed automatic transmission between the first speed and third speed power trains. After establishment of the third speed power train as above described the transmission will continue in operation through this power train so long as the vehicle proceeds at speeds above a predetermined minimum speed at which the inertia weights 106 will be moved radially inwardly. Upon attainment of this predetermined minimum speed and the inward movement of the inertia weights the cam 98 in Fig. 5 will be rotated clockwise into the position shown for moving the arm 93 and the shifter fork 90 counterclockwise to disengage the clutch 82 whereby the third speed power train is interrupted and the first speed power train becomes established for operation upon subsequent opening of the engine throttle.

The first speed train can be established at will by depressing the heel portion of the accelerator pedal to cause disengagement of the clutch 82 and then accelerating the engine to pick up the drive through the overrunning clutch 45 included in the first speed train.

*Third typical operation of the transmission*

The operator may set the transmission for automatic operation in a range involving the second and fourth speeds and to do this he will set the cam plate 136 in the position shown in Fig. 8 whereby the clutch 68 will be brought into use. Assuming the clutch 68 to be thus closed and the clutch 82 open, the second speed power train will be established through the gears 33 and 34, overrunning clutch 45, countershaft 42, gears 59 and 62, said clutch 68 and the member 63 to the driven shaft 27. An automatic change can then be made to the fourth speed power train at any time while the vehicle is proceeding sufficiently fast for the inertia weights 106 to be in their outward position with the effect of permitting the spring 94, Fig. 5, to press the clutch teeth 84 in ratcheting relation with the clutch teeth 83. Such change to the fourth speed power train is initiated by closing the engine throttle to cause deceleration of the clutch teeth 83 relatively to the clutch teeth 84 as permitted by the overrunning cluch 45 and synchronization of the clutch teeth 83 and 84 whereupon the clutch 82 is closed by the force of the spring 94. The fourth speed power train including said clutch 82, gears 61 and 58, countershaft 42, gears 59 and 62, clutch 68 and the splined member 63 will then be established. Operation through this power train will be continued until the vehicular speed decreases to a point where the weights 106 are drawn inwardly and the cam 98, Fig. 5. actuated for disengaging the clutch 82 and thus reestablishing the second speed power train. Reestablishment of the second speed power train can be effected at will by pressing upon the heel of the accelerator pedal to disengage the clutch 82 and accelerating the engine.

The transmission normally will be operated in the present automatic range during open highway driving where higher vehicular speeds are used.

*The reverse power train*

Establishment of the reverse power train is accomplished by rotating the cam plate 136 clockwise from the neutral position shown in Fig. 3 to the position shown in Fig. 6, incident to which the right edge of the slot spur 156 in this cam slides along the stud 153 while displacing the same forwardly together with the shifter fork 79 and the reverse idler gear 76. Meanwhile the cam slot 137 moves idly along the stud 138 so the splined member 63 remains in the neutral position with the reverse gear 75 aligned with the reverse gear 60 and the forwardly moved idler gear 76 is disposed mutually in mesh with said gears 60 and 75. Also at this time the stud 150 will have been cammed forwardly by the camming section 159 on the cam 136 and will rest against a portion of the greater radius cam section 160 whereby the spring 152, Fig. 3, will be compressed and the shifter fork 57 shifted forwardly to engage the lockout clutch 50—51 for the overrunning clutch 45. The reverse power train thus established includes the gears 33 and 34, said clutch 50—51, ring 52, spline connections 53 and 49, countershaft 42, and the gears 60, 76 and 75 to the driven shaft 27.

*Connection for starting engine by movement of vehicle*

The fourth speed power train may be established while the vehicle is at rest to enable the engine to be started by pushing or pulling the vehicle. This connection is made by manually displacing a link 218, Fig. 5, backwardly whereby the arm 101 and the cam 98 are rotated counterclockwise to enable the spring 94 to engage the clutch 82. A control linkage (not shown) extends from said link 218 into convenient reach of the operator, and a lost-motion connection comprising a slot 219 in the link and a pin 219a on the arm 101 enables the governor controlled arm to be rotated independently of the link under normal operating conditions. The operator in establishing the fourth speed train must also manipulate the control cable 144, Fig. 4, to place the cam 136 in the position shown in Fig. 8 for causing engagement of the clutch 68.

*First modification*

The modified form of the invention shown in Figs. 10 to 15, is also a four-speed structure with two automatic two-speed ranges and differs from the first embodiment primarily by employing power trains of different speed and control means which changes the order in which the power trains are established. The above described transmission is designed for use upon a motor vehicle having rear axle gearing of the conventional ratio, the third speed being obtained when the drive and driven shafts of that transmission are connected directly in a one-to-one ratio and the fourth or overspeed being obtained when the driven shaft is connected through a power train causing it to be driven at greater speed than the drive shaft. This second embodiment of the invention on the other hand is designed for use upon a motor vehicle with a "geared up" rear axle gearing so that when the drive and driven shafts 26' and 27' of this transmission are connected directly in a one-to-one ratio the road wheels will be driven at substantially the same speed with respect to the transmission drive shaft as these road wheels would be driven with respect to the transmission drive shaft of the first embodiment when the fourth speed power train of said first embodiment is disposed in serial relation with a rear axle gearing of conventional ratio. The three lower speed power trains in this second embodiment are of such speed reduction as to produce, in conjunction with the aforesaid "geared up" rear axle gearing, over-all driving speeds between the transmission drive shaft and the vehicle road wheels corresponding respectively to the driving speeds produced by the three lower speed power trains of the above described embodiment when they are disposed in serial relation with a conventional rear axle gearing.

Since the parts in this second form of the invention are similar to those above described in the first form of the invention, this description is expedited by applying the same reference characters to the respectively corresponding parts but with a prime added.

The first speed power train is established by shifting the splined member 63' rearwardly for engaging the clutch 68', power being then transmitted from the drive shaft 26' through the gears 33' and 34', overrunning clutch 45', countershaft 42', gears 59' and 62', said clutch 68' and the splined member 63' to the driven shaft 27'.

The second speed power train is established when the splined member 63' is slid forwardly for engaging the clutch 65', the power being then transmitted through the gears 33' and 34', overrunning clutch 45', gears 58' and 61', said clutch 65' and the member 63' to the driven shaft 27'.

Third speed is attained by the concurrent engagement of the clutches 82' and 68' wherefore the power is transmitted from the drive shaft through said clutch 82', clutch ring 85', splined connection 86', the hub extension 87' of the gear 61', gears 61' and 58', countershaft 42', gears 69' and 62', clutch 68' and the member 63' to the driven shaft 27'.

The fourth speed power train is established by concurrent engagement of the clutches 82' and 65' to provide for the transmission of the power from the drive shaft through said clutch 82', clutch ring 85', splined connection 86', hub extension 87' of the gear 61', said clutch 65' and the splined member 63' to the driven shaft.

It will be seen in the present transmission that the member 63' must be shifted rearwardly for engaging the clutch 68' when the first and third speed power trains are established and that said member 63' must be shifted forwardly for engaging the clutch 65' when the second and fourth speed power trains are established, this being the reverse of the positions occupied by the member 63 in the first embodiment. Therefore, the camming slot 137' in the cam plate 136', Figs. 11 to 15, is modified for reversing the movement imparted to the stud 138' when his cam is rotated for establishing the first and third speed setting and the second and fourth speed setting. Thus comparing the cams 136 and 136' as they appear in Figs. 3 and 11 where they are shown in their neutral positions, the corresponding portions A and A' of the camming slots 137 and 137' are at the same radial distance from the axis of their respective cams whereby the studs 138 and 138' are both disposed in the neutral position.

In rotating the cam plate 136' counter-clockwise to the position shown in Fig. 13 for establishing the first speed power train it is necessary for the member 63' to be moved rearwardly for engaging the clutch 68' wherefore the first and third speed portion B' of the groove 137' is disposed radially inwardly of the cam 136' with respect to the neutral portion A' of this cam, the portion B' being disposed circumferentially of the cam 136' in the position corresponding to that of the portion B of the cam 136 but being disposed radially of the cam 136 at a distance suitable for moving the stud 138' downwardly far enough to effect engagement of the clutch 68'. The present transmission employs springs corresponding to the springs 120 and 121 in the first described transmission, and of which springs an end section of the spring 120' corresponding to the spring 120 is shown in Fig. 10.

Upon rotation of the cam plate 136' into the position shown in Fig. 14 for shifting the splined member 63' forwardly preparatory to establishing either the second or fourth speed power trains, it will be necessary for the stud 138' to be moved upwardly wherefore the groove portion C' for receiving the stud 138' is spaced more distantly radially outwardly of said cam 136' than the neutral portion A' of this slot.

With the exception of the slot 137' in the cam 136', the camming sections of said cam are the same as those of the cam 136, and since the portions A', B' and C' of said slot 137' are arranged circumferentially of the cam 136' in the same order and spacing as are the portions A, B and C of the slot 137 in the cam plate 136, corresponding rotative positions of the cams 136 and 136' will result in corresponding connections of power trains. Thus it will be observed upon comparing Fig. 11 with Fig. 3, that the lobe 146', the circular profile 149' and the cam slot 154' are respectively positioned for holding the clutch 82' disengaged, for holding the clutch 50'—51' disengaged and for holding the reverse idler gear 76' in the inoperative position similarly to which the lobe 146, the circular profile 149 and the cam slot 154 respectively provide for the condition of the clutches 82 and 50—51 and the reverse idler gear 76.

When the cam plate 136' is set for first and third speeds with the camming slot portion B' in receiving relation with the stud 138', as shown in Fig. 13, the short radius section between the lobe 146' and the rise 161a' is in registry with the stud 147' to leave the clutch 82' under control of the speed responsive mechanism 103', the short radius section 149' is in registry with the stud 150 to provide for disengagement of the clutch 50'—51' and the leg 155' of the camming slot 154' is in idling receiving relation with the stud 153' whereby the reverse idler gear 76' is held in the inoperative position. Thus the cam 136' while in this position functions in all respects similarly to the cam 136 when correspondingly positioned as illustrated in Fig. 7.

When the cam plate 136' is rotated counter-clockwise a step further for bringing the cam slot portion C' into cooperative relation with the stud 138' which position, shown in Fig. 14, corresponds to the second and fourth speeds, a portion of the short radius section of the cam profile between the lobe 146' and the rise 161a' is in registry with the stud 147 to still provide for the clutch 82' being under control of the speed responsive mechanism, the curved profile section 149' presents a portion to the stud 150 whereby the clutch 50'—51' remains disengaged and the cam slot leg 155' still idly receives the stud 153' with the reverse idler gear 76' in the inoperative position. Hence the cam 136' while in this position functions in all respects similarly to the cam 136 when in the corresponding position shown in Fig. 8.

While the transmission is operating through the second speed power train, this power train may be converted into a two-way-drive train by rotating the cam plate 136' counter-clockwise until the slot section D' is carried into receiving relation with the stud 138'. Such movement of the cam 136' relatively to the stud 138' imparts no movement to said stud but pursuant to this rotation of said cam the lobe 146' will be carried against the stud 150' for shifting this stud to the left and causing engagement of the lockout clutch 50'—51' for the overrunning clutch 45'. Simultaneously the rise 161a' will be passed beneath the stud 147' for lifting said stud for positively holding the clutch 82' disengaged. While in this position the cam plate 136' functions in all respects similarly to the cam plate 136 when it occupies the corresponding position illustrated in Fig. 9.

The cam plate 136' is shown in Fig. 12 in the position for establishing the reverse power train. Here the spur 156' of the cam slot 154' is shown in the position where it has cammed the stud 153' to the left for bringing the reverse idler gear 76' into mesh with the reverse gears 60' and 75'. Meanwhile, the arcuate section of the slot 137' is in idling relation with the stud 138' for retaining this stud in a position providing for disengagement of the clutches 65' and 68' and alignment of the gears 60' and 75'. Also a section of the profile 160' will be disposed against the stud 150' for holding the same to the left and thus providing for engagement of the lockout jaw clutch 50'—51' for the overrunning clutch 45'. While in this position the cam 136' functions in all respects similarly to the cam 136 in the corresponding position shown in Fig. 6.

Attention is directed to the fact that the bevelling on the clutch 65' is reversed with respect to the bevelling upon the clutch 65. Bevelling of the teeth of these clutches 65' and 68' is determined by which of the counterparts thereof is to be rotating at the greater speed when their tooth end faces are pressed together preparatory to being meshed. Referring to Fig. 10 it will be seen while the transmission is operating through the first speed power train including the gears 59' and 62' that the gears 58' and 61' of the second speed power train will cause the clutch teeth 66' to be rotating at greater speed than the teeth 64' which at that time are rotating with the driven shaft. Hence at the time of shifting from the first to the second speed, the bevelling shown upon the teeth 66' and 64' will facilitate the ratcheting of the teeth 66' over the more slowly rotating teeth 64'.

After establishment of the second speed power train and attainment of the vehicular speed at which the speed control mechanism is actuated for pressing the clutch teeth 84' against the end faces of the clutch teeth 83' the establishment of the third speed power train is initiated by momentary closing of the engine throttle which is followed by closing of the clutch 82' when the engine and the clutch teeth 83' decelerate to the speed of the clutch teeth 84'. Meanwhile, the clutch teeth 67' will have been rotating at a speed in excess of the clutch teeth 69' and the bevelling upon the teeth of the clutch 68' is such as facilitates ratcheting of the faster rotating teeth 67' over the teeth 69' at the time the member 63' is slid rearwardly as a part of the action involved in this shift from second speed to third speed. Subsequent to the aforesaid engagement of the clutch 82' and reopening of the engine throttle the gear 62' will be speeded up to synchronism with the member 63' at which time the clutch 68' will fall into mesh for establishing the third speed power train.

During operation of the third speed power train the gear 61', which is connected through the clutch 82' with the drive shaft 26', will be rotating at greater speed than the driven shaft 27', and during a shift from third to fourth when the engine throttle is momentarily closed and the member 63' slid forwardly the bevelling of the clutch 65' will again facilitate movement of the teeth 66' in ratcheting relation over the more slowly rotating teeth 64' until such time as the engine decelerates sufficiently for the counterparts of this clutch to reach synchronism whereupon said clutch becomes meshed and the fourth speed power train established.

*Second modification*

The third embodiment of the invention, shown in Figs. 16 to 19, has four forward speeds, and, like the second embodiment, is designed for use in combination with a "geared up" rear axle. When this transmission is employed in combination with such a rear axle the first, second and third forward speeds which are obtained through power trains including speed reduction gearing respectively correspond to the first, second and third speeds (of which the third is obtained by direct connection of the drive and driven shafts) of a conventional three speed transmission in conjunction with a conventionally geared rear axle, while the fourth or direct speed of this transmission corresponds to a fourth or overdrive speed of such a conventional transmission when operating with an overdrive device.

The first speed power train comprises a gear 220 integral with a drive shaft 221 and meshed with a countershaft gear 222 which has a long sleeve-like hub 223 journalled by means of needle bearing sets 224, 225 and 226 upon a rod 227 suitably anchored in the ends of a gear box 228. Power is transmitted from the gear 222 through an overrunning clutch 229 similar to the clutch 45 hereinabove described and including a driving ring 230, clutch rollers 231 and an actuator member 232 having a splined hub 233. From this hub 233 the power is transmitted to a countershaft gear 234 through a splined connection 235, said gear being journalled upon a set of needle bearings 236 which ride about the sleeve 223. The transfer of power continues through a jaw clutch 237 comprising a driving component of clutch teeth 238 upon the back end of the gear 234, a driven component comprising teeth 239 upon a hub 240 of a gear 241 and a clutch ring 242 having internal teeth mutually meshable with the teeth 238 and 239 by sliding said ring forwardly. A groove 243 facilitates axial sliding of the ring 242 by means of a shifter fork 244 shown in Fig. 18. Said first speed power train is mobilized when the teeth of the clutch 237 are meshed. Thus the gear 241 which is rotatable about the sleeve 223 and held against axial movement by thrust bearing members 245 and 246 is driven through the clutch 237 and drives a gear 247 which is journalled by means of its hub 248 upon a hub 249 of a gear 250 which is splined at 251 to a transmission driven shaft 252. Power is transmitted from the gear 247 through an overrunning clutch 253, of which said gear is the driving member, clutch rollers 254 and an actuator member 255 which is splined to the driven shaft 252. This actuator member 255 is adapted to wedge the rollers 254 against the inner periphery of the gear or driving member 247 when said gear is rotated clockwise as viewed from the front end of the transmission and thus cause transmission of driving force from said gear through the rollers and the actuator member to the driven shaft.

The second speed power train includes the drive shaft 220, the countershaft gear 222, overrunning clutch 229, splined connection 235 and the gear 234 in common with the first speed power train. However, the second speed power train which includes gears 234 and 260 becomes effective and shunts out the remaining portion of the first speed train when an overrunning jaw clutch 256 is closed. Said clutch 256 includes clutch teeth 257 projecting forwardly from a member 258 which is splined to and axially slidable upon the driven shaft 252, and clutch teeth 259 projecting rearwardly from gear 260 journalled upon the driven shaft. During operation of the second speed power train the driven shaft will rotate faster than the gear 247 as permitted by the overrunning clutch 253.

Third speed is obtained when the clutch 256 is disengaged and a clutch 261 is engaged. Clutch 261 comprises clutch teeth 262 and 263 which are respectively upon a ring 264 and the back end of the gear 220. Said ring 264 is splined at 265 to the hub 266 of the gear 260. Hence when the clutch 261 is closed, and the clutch 256 opened, power may be transmitted from the drive shaft to the driven shaft through the third speed power train comprising said clutch 261, the ring 264, splined connection 265, gear hub 266, gears 260 and 234, clutch 237, gear hub 240, gears 241 and 247 and the overrunning clutch 253 to the driven shaft. Meanwhile the actuator member 232 of the overrunning clutch 229 will be rotated faster than the clutch ring 230 as permitted by the clutch rollers 231.

Fourth speed is obtained by connecting the drive and driven shafts 221 and 252 for rotation in unison and the power train for accomplishing this is effected by concurrent engagement of the clutches 261 and 256, power then being transmitted from the drive shaft through said clutch 261, clutch ring 264, splined connection 265, gear hub 266, gear 260, clutch 256 and the splined member 258 to the driven shaft 252. Concurrently the actuator member 232 of overrunning clutch 229 will be driven at an overspeed with respect to the clutch ring 230 as permitted by the clutch rollers 231 and the actuator member 255 of the overrunning clutch 253 is driven at an overspeed with respect to the gear 247 as permitted by the clutch rollers 254.

The reverse power train includes the gears 220 and 222, the sleeve hub 223 for the gear 222, a gear 270 which is splined at 271 to a rear end section of said sleeve hub, a reverse idler gear 272 which is freely rotatable upon a countershaft 269, Fig. 17, and the gear 250 which is splined to the driven shaft 252. This power train is mobilized when the clutches 237, 256 and 261 are disengaged and when the idler gear 272 is slid rearwardly into mutual mesh with the gears 270 and 250 in the well-known manner.

The gear 260 which corresponds to the gears 61 and 61' in the first and second embodiments is provided with axial thrust absorbing means in the form of a thrust ring 267 that functions similarly to the rings 215 and 215' and a ring 268 corresponding to the rings 217 and 217'. The slant of the teeth on the helical gears 234 and 260 is such that during operation in second speed when the gear 260 is connected non-rotatively with the driven shaft 252 by the clutch 256 and power is transmitted from the gear 234 to the gear 260 said teeth will impart rearward axial force to the gear 260, and since the gear is held non-rotatively upon the driven shaft this force will be absorbed by the ring 267 while no relative movement occurs between this ring and the gear wherefore no frictional heat is generated. During operation in the third speed connection while the clutch 261 is engaged and power is transmitted from the gear 260 to the gear 234, said gear 260 which is then held in non-rotative relation with respect to the drive shaft will be urged forwardly by said gear teeth but this axial force of the gear will be absorbed by the thrust bearing 268 which is then clamped between the hub 266 and the back end of the drive shaft 221 for rotating with these parts relative to the more slowly rotating driven shaft 252. Hence again there is no relative movement between the gear 260 and the cooperative thrust ring.

A lockout for the overrunning clutch 229 is provided as in the first two embodiments of the invention to convert the second speed power train into a two-way-drive train. This lockout is in the form of a jaw clutch 275 which includes teeth 276 on the overrunning clutch ring 230 and teeth 277 meshable with the teeth 276 and integral with a ring 278 which is splined at 279 to the hub 233 of the clutch actuator member 232. A groove 280 in the ring 278 accommodates the shoes as 281 of the shifter fork 282.

Alternative controls are shown for this third form of transmission apparatus. The first of these controls is illustrated in Figs. 17 and 18 and is adjustable for setting the transmission to enable an automatic shift from first speed to second speed and from second to fourth speed. The control also includes means manually operable at will for disrupting the fourth speed power train incident to establishing the third speed power train.

Referring now to Figs. 17 and 18, the controls will be seen to include a shaft 290 journalled in a sleeve 291 which in turn is journalled within a bearing 292 in a side wall of the gear box 228. Rotation of the shaft 290 is effected manually by means of a control arm 293 and the inner end of this shaft carries a generally circular cam plate 294.

The cam plate 294 and its control arm 293 (represented by dot-dash lines) are shown in the neutral position in Fig. 18. The letter N designates such neutral position of these parts, whereas a character R designates their reverse drive position, the letter F designates the normal forward drive position, and the indicia "2nd lock" designates a special position into which said parts are settable for eliminating the overrunning feature of the second speed train.

Said cam plate 294 comprises a long radius profile section 295, a rise section 296 and a short radius section 297 cooperable with a stud 298 upon one end of a lever 299 pivoted upon a stub shaft 300 and operable when in the counterclockwise position shown for maintaining the shifter fork 282 in its right or rearmost position upon the shifter fork rod 301 while compressing a spring 302. The back end of the spring 302 bears against a collar 303 suitably fixed to the rod so that when the cam 294 is rotated counter-clockwise sufficiently to carry the short profile section 297 into registry with the stud 298 such spring 302 will be effective for sliding the fork 282 forwardly incident to pivoting the lever 299 clockwise and disposing the stud 298 against said profile section 297. This forward movement of the shifter fork 282 slides the clutch ring 278, Fig. 16, forwardly for engaging the lockout clutch 275 during operation of the second speed power train for making this train two-way-drive in character.

One portion of an irregular slot 304 in the cam plate 294, and for the most part shown in dotted outline behind a cam plate 305 upon the sleeve shaft 291, receives and cooperates with a stud 306 upon the end of an arm 307 projecting upwardly from the hub 308 of the shifter fork 244. As explained hereinabove the shifter fork 244 is operable to control the condition of the jaw clutch 237 shown in Fig. 16.

Another portion of the cam slot 304 receives and controls the position of a stud 309 of which an end is anchored in an arm 310 which is freely pivotal upon a cross shaft 311 journalled in opposite side walls of the gear box. Said stud 309 is also pivotally connected with one end of a link 312 of which the opposite end is pivotally connected with an arm 313 by means of a pin 314. A stub shaft 315 serves as a pivot for the upper end of the arm 313 while the lower end of this arm is disposed between a pair of bosses 316 and 317 upon a hub 318 of a shifter fork 319 for the reverse idler gear 272 shown in full lines in Fig. 17 and in dotted outline in Fig. 16. Shoes as 320, of which one is shown in dotted outline in Fig. 17, upon the legs of the shifter fork 319 cooperate with a groove 321, Fig. 16, in the hub of the gear 272 for moving this gear axially upon its countershaft 269.

Respectively long and short radius profile sections 322 and 323 and a rise section 324 on the cam 294 cooperate with a stud 325 upon the lower end of an arm 326. The upper end of this arm is fixed to the pivotal cross shaft 311 by means of a pin 327, Fig. 17. A coil spring 334 under tension about the shaft 311 has an end section 335, Fig. 18, bearing against a cover plate 336 and an opposite end section 337 bearing against the back side of a shifter fork 331 of which the hub 330 is pivoted on said shaft and thus constantly exerts a force tending to rotate this shifter fork clockwise as viewed in Fig. 16 for engaging the jaw clutch 256, there being trunnions 332 operatively connecting the legs of the shifter fork 331 with a shifter shoe 333 for the splined member 258. So long, however, as the cam profile section 322 is in registry with the stud 325, the arm 326 and the cross shaft 311 are maintained at a counter-clockwise oscillative limit in which a pin 328 on the shaft 311, while bearing against a stud 329 on the hub 330 of the shifter fork 331, holds the shifter fork (against the force of the spring 334) in the counter-clockwise position shown in Fig. 16 for effecting disengagement of the jaw clutch 256.

A lobe 338 upon the cam plate 294, a rise 339, a short radius section 340, a second rise 341 and a dwell 342 cooperate with a stud 343 on an arm 344 of which the hub 345 is fixed to a cross shaft 346 which is journalled in the opposite side walls of the gear box. A shifter form 348, Fig. 16, journalled upon the shaft 346 has trunnion-like bearing means, similar to that shown at 332 in association with the shifter fork 331, for establishing an operative connection therebetween and a shifter fork shoe 349 having a flange 350 disposed in a groove 351 circumscribing the clutch ring 264. A coil spring 352, Fig. 18, is placed about the shaft 346, said spring having an end section 353 bearing against the cover plate 336 and an opposite end section (not shown), similar to the end section 337 of the spring 334, bearing against the back side of the shifter fork 348 and thus urging said shifter fork to pivot clockwise as viewed in Fig. 16 for engaging the clutch 261. This force of the spring 252 is contravened by a stud (not shown but similar to the stud 329 on the fork 327) on the fork 348 which abuts against a pin (not shown but similar to the pin 328 in the cross shaft 311) in the cross shaft 346 when the lobe 338 on the cam 294 is disposed in registry with the stud 343 whereby the arm 344, the shaft 346 and the shifter fork 348 are maintained in the counter-clockwise position shown in Figs. 16 and 18.

The sector-like cam plate 305 is rotatable independently of the cam plate 294 by means of an arm 355 upon the outer end of the sleeve 291. The studs 325 and 343 are sufficiently long to cooperate with the cam plate 305 as well as the cam plate 294 as can be seen upon examining the stud 325 in Fig. 17. Said arm 355 is operated by a speed responsive device as that mentioned hereinabove in the description of the first embodiment and such as that shown at 103 in Fig. 1. At low speeds of the transmission drive shaft 221 this speed responsive device will function to cause the cam plate 305 to occupy the position shown in Fig. 18 but upon a predetermined increase in speed of said shaft the arm 355, the sleeve 291 and said cam plate 305 will be rotated counter-clockwise for carrying the lobes 356 and 357 thereon from registry with the studs 343 and 325 and placing the short radius sections 358 and 359 in registry with these studs to permit clockwise rotation of the arm 344 and 326 by the force of the springs 352 and 334 to place the clutches 261 and 256 in ratcheting relation and to cause engagement of these clutches upon synchronisation of their counterparts as will be explained presently.

*Operation of the second modification*

In starting the vehicle forwardly from rest a control linkage (not shown) reaching from the arm 293 into the driver's compartment will be manipulated by the operator for rotating said arm from the neutral position N, Fig. 18, to position F. This having been done the operator will cause the drive shaft 221 to be clutched in driving relation with the vehicle engine and if a speed responsive clutch, as that mentioned hereinabove in connection with the first described embodiment, is disposed between the engine and the transmission drive shaft said shaft will be automatically connected with the engine pursuant to engine acceleration.

Such movement of the control arm 293 from position N to position F will rotate the cam plate 294 counter-clockwise for placing the short radius section 340 in registry with the stud 343 and for placing the short radius section 323 in registry with the stud 325 and thereby leaving these studs 343 and 325 in the position shown, under control of the lobes 356 and 357 on the governor controlled cam 305, for maintaining disengagement of the clutches 261 and 256. This counter-clockwise rotation of the cam 294 also carries section I of the cam slot 304 into registry with the stud 306 whereby said stud and the shifter fork 244 are slid forwardly upon the rod 301 to engage the clutch 237, Fig. 16. The stud 309 remains in the position shown during rotation of the arm 293 from position N to position F while the arcuate section III of the slot 304 moves idly past said stud. Consequently the reverse arm 313 remains in the neutral position shown whereby the reverse idler gear 272 remains out of mesh with the reverse gears 270 and 259. Furthermore, a portion of the long radius section 295 of the cam 294 slides past the stud 298 to avoid disturbance of the disengaged condition of the lockout clutch 275, Fig. 16.

Following the connection of the drive shaft 221 with the vehicle engine, the vehicle will be driven forwardly through the first speed power train including the gears 220 and 222, overrunning clutch 229, splined connection 235, the hub portion of the gear 234, jaw clutch 237, gears 241 and 247 and the overrunning clutch 253. Upon the vehicle attaining a predetermined speed the aforementioned speed responsive device, acting through the arm 355, will rotate the cam plate 305 counter-clockwise for bringing the short radius profile sections 358 and 359 into registry with the studs 343 and 325 to enable the springs 352 and 334 to pivot the arms 344 and 326 counter-clockwise pursuant to placing the clutches 261 and 256 in ratcheting relation. At this time the second speed gear 260 will be rotating faster than the driven shaft 252 with which the splined member 258 rotates wherefore the ends of the clutch teeth 259 and 257 are bevelled in the manner shown to facilitate ratcheting of the teeth 259 over the teeth 257. Likewise, the drive shaft 221 upon which the clutch teeth 263 are fixed will be rotating faster than the second speed gear 260 with which the clutch teeth 262 rotate wherefore the ends of the teeth 262 and 263 are bevelled to facilitate ratcheting of the teeth 263 past the teeth 262.

Subsequent to the clutches 261 and 256 being placed in ratcheting relation the second speed power train may be automatically established by momentary closing of the engine throttle to cause the drive shaft 221 and the second speed gear 260 to decelerate while the clutch teeth 257 continue rotating at substantially constant speed as permitted by the overrunning clutch 253. When the gear 260 decelerates to synchronism with the driven shaft 252 the spring 334 will slide the splined member 258 forwardly to mesh the teeth of the clutch 256. This engagement of the clutch 256 mobilizes the second speed power train so that upon opening of the engine throttle, power will be transmitted through such power train which includes the gears 220 and 222, overrunning clutch 229, splined connection 235, gears 234 and 260, clutch 256 and the splined member 258. Overrunning of the clutch 253 continues as does the ratcheting of the teeth in the overrunning jaw clutch 261.

An automatic shift into the fourth speed power train, while operating in the second speed power train, is initiated by momentarily closing the engine throttle for causing the drive shaft 221 to decelerate with respect to the driven shaft with which the clutch teeth 262 are then fixed, this being permitted by the overrunning clutch 229. When the shaft 221 synchronizes with the shaft 252 the spring 352 will become effective for shifting the clutch ring 264 forwardly and thus engaging the clutch 261. The fourth speed power train comprising the clutch 261, splined connection 265, the hub portion of the gear 260, clutch 256 and the splined member 258 will then be established. Meanwhile the actuator members 232 and 255 of the overrunning clutches 229 and 253 will be rotated faster than their normal driving members 330 and 247.

While operating in the fourth speed the operator may, at will, establish the third speed power train to obtain more power for quickly passing a more slowly moving vehicle overtaken on the highway, and this establishment of the third speed power train is accomplished by disengaging the clutch 256 while leaving the clutch 261 engaged. Apparatus for disengaging the clutch 256 includes a solenoid 360, Fig. 19, having a reciprocal core 361 operably connected with the arm 326 and, hence with the fork 331. An electric control for the solenoid may be similar to that show in Figs. 5 and 5a and by manual operation of this control during operation of the fourth speed power train, the operator can energize the solenoid 360 for disconnecting the clutch 256 and thus effectuating the third speed power train which includes the clutch 261, clutch ring 264, splined connection 265, gear hub 266, gears 260 and 234, clutch 237, gears 241 and 247 and the overrunning clutch 253.

While operating in the second speed power train, the stud 306 then being at section I of the cam slot 304, said train may be converted into a two-way-drive train by shifting the arm 293 from position F to position "2nd lock" whereby the short radius profile section 297 is carried into registry with the stud 298 and the spring 302 operates the shifter fork 282 for engaging the clutch 275. Prior to the stud 298 descending the rise 296 onto the profile section 297, the rise 341 will be carried beneath the stud 343 and the profile section 342 will be placed in registry with the said stud whereby the clutch 261 is disengaged. This action of the rise 341 and of the profile section 342 assures that the clutches 261 and 275 will not be simultaneously meshed with resulting damage to the transmission. The elevation of the cam profile section 342 is gauged so as to slide the clutch teeth 262 far enough backwardly to withdraw their short sides axially from the short sides of the teeth 263 so the teeth 263 may ratchet past the teeth 262, but not sufficiently backwardly to circumferentially disalign the longer or pointed sides of said teeth, thereby assuring that the teeth 262 are constrained from rotating faster than the teeth 263 when these teeth are later remeshed.

The reverse power train is established by rotating the control arm 293 clockwise from position N to position R for bringing section II of the cam slot 304 into registry with the stud 309 and thereby shifting the link 312 rearwardly for pivoting the arm 313 counter-clockwise and shifting the fork 319 and the reverse idler gear 272 rearwardly and thus meshing said gear 272 with the reverse gears 270 and 250. The reverse train comprising the gears 220 and 222, the sleeve shaft 223, and said gears 270, 272 and 250 will then be established. It will be noted that this reverse train is operable for transmitting power in either direction between the drive and driven shafts 221 and 252. In rotating the cam plate 294 into the reverse position the profile section 295 remains engaged with the stud 298 so that the lockout clutch 275 remains disengaged. The profile sections 338 and 322 remain in registry with the studs 343 and 325 so that the jaw clutches 261 and 256 remain disengaged, and slot section III moves idly along the stud 306 so that the jaw clutch 237 is maintained disengaged.

The parts shown in Fig. 19, with the exception of the governor controlled cam plate 305', are the same as those illustrated in Fig. 18 and are therefore identified by the same respective reference characters. The cam plate 305' is identical with the cam plate 305 in Fig. 18 excepting that the cam 305' has no lobe 357. This modification of the governor controlled cam plate causes this third form of the transmission to normally start the vehicle forwardly through the second speed power train and to effect an automatic shift from the second speed train to the fourth speed train after the vehicle has gotten under way in the above described manner. However, these controls are operable for changing from the fourth speed train to the third speed train at will and for establishing the low speed train at will as will be explained presently.

When the cam plate 294, Fig. 19, is manually rotated counter-clockwise from the neutral position shown (indicated at N) to the forward position F the short radius section 340 of said cam plate will be carried into registry with the stud 343 to leave said stud in the position shown under control of the lobe 356 on the governor controlled cam 305'. Simultaneously the profile section 322 is removed from the stud 325 and the short radius profile section 323 carried into registry with said stud, and since there is no lobe corresponding to the lobe 357 upon the cam plate 305' the stud 325 will be permitted to move radially inwardly of the cam plate 294 while the spring 334, Fig. 17, rotates the shifter fork 331 clockwise as viewed in Fig. 16 for meshing the teeth 257 and 259. If the teeth 257 and 259 happen to be axially aligned so they abut instead of meshing, the teeth 257 will slide into mesh with the teeth 259 upon initial rotation of the gear 260 when the driven shaft 225 is clutched to the vehicle engine.

With the present arrangement which provides for the vehicle being started forwardly in second speed, I prefer to employ a turbine type of fluid coupling for connecting the drive shaft 221 with the engine so that greater engine speed and therefore greater driving force can be applied to the shaft 221. Any clutch may, however, be used. After the vehicle attains a predetermined speed the speed responsive mechanism will rotate the cam plate 305' counter-clockwise for carrying the short radius section 358 thereof into registry with the stud 343 to permit ratcheting of the teeth in the jaw clutch 261. The shift into the fourth speed train is then accomplished as before by closing the engine throttle to cause deceleration of the drive shaft 221 to synchronism with the driven shaft 252 whereupon the spring 352, Fig. 18, meshes the teeth of the clutch 261.

While operating through the fourth speed train a change can be made at will into the third speed train by closing the aforesaid electric circuit for energizing the solenoid 360 whereby the clutch 256 is disengaged.

During operation of the second speed train, or, while the vehicle is standing at rest with the cam plate 294 rotated to position F, said second speed train may be connected as a two-way drive train by rotating the cam plate 294 one additional step counter-clockwise to the position designated "2nd lock." This connection occurs following registration of the short radius cam section 297 with the stud 298 for terminating the constraining action of the lever 299 upon the spring 302.

The first speed power train may be established at any time or at the time of starting the vehicle forwardly by rotating the cam plate 294 to the position designated "Low em." When this is done the rise section 364 will be passed beneath the stud 325 for rotating the arm 326 counter-clockwise and the profile section 295 will serve to maintain this arm in the counter-clockwise position. Thus the clutch 256 is disengaged. The clutch 261 will also be disengaged at this time since the profile section 342 will be in registry with the stud 343, and since the stud 306 is at this time maintained forwardly in section IV of the groove 304 the clutch 237 will be closed and the first speed power train mobilized. While operating in the low emergency or first speed power train the cam plate 294 may be rotated backwardly to position F since to do so will merely place the short radius profile section 323 in registry with the stud 325 whereby the teeth of the jaw clutch 256 will be placed in ratcheting relation, and the short radius profile section 340 will be placed in registry with the stud 343 so that if the vehicle happens to be advancing at sufficient speed for the cam plate 305' to be in its counter-clockwise position the short radius section 358 will be in registry with the stud 343 to permit the arm 344 to rotate clockwise and place the clutch 261 in ratcheting relation. The transmission is then conditioned for an automatic shift to the second speed upon momentary closing of the engine throttle, and into fourth speed upon a succeeding momentary closing of said throttle as above described.

A shift into the fourth speed power train will normally be made automatically from the second or the third speed trains although it is possible to shift directly from first to fourth. For instance while operating through the first speed train it will be noted that by permitting the engine throttle to remain closed sufficiently long the teeth 263 of the clutch 261 will eventually synchronize with the teeth 262 subsequently to the closing of the clutch 256 and thus automatically establish the fourth speed connection.

An alternative way to start this embodiment in the first speed connection with the present control is to depress the heel portion of the accelerator pedal to energize the solenoid 360 and thereby hold the jaw clutch 256 demeshed following rotation of the control cam 294 to position F. While the heel portion of the accelerator pedal is maintained depressed for thus demobilizing the second speed train, the toe portion of said pedal is depressed for accelerating the engine and driving the vehicle through the first speed train. The heel portion of the pedal may be released upon initial operation of the first speed train for at that time the ratcheting relation of the teeth in the clutch 256 will prevail and prevent meshing thereof. Subsequent shifts into second and fourth speeds may be executed in the normal manner already explained.

When the speed responsive cam plate 305' is employed the apparatus is normally operated as a two-speed automatic transmission. This mode of operation is highly desirable from the standpoint of its simplicity of control. Moreover, it expedites "get away" under ordinary driving conditions. Instantaneous availability of the first and third speeds uniquely provides in this transmission the manually supervised flexibility necessary for meeting extraordinary driving conditions as they arise. The transmission is especially attractive from the manufacturing viewpoint since it is compact and requires relatively few parts which are readily assembled and easily produced by standard machine shop methods.

I claim:

1. A change-speed transmission comprising coaxial drive and driven shafts, a countershaft, an overrunning power train drivingly disposed between the driven shaft and the countershaft, a plurality of power trains of different speed transmitting capabilities alternatively establishable between the drive shaft and the countershaft for operation in series with said drivingly disposed power train between the drive and driven shafts, the lower speed of said plurality of power trains including an overrunning clutch device in series therewith, the other of said plurality of power trains including a freely rotatable member disposed coaxially of the drive shaft, a clutch operable to connect said freely rotatable member with the drive shaft for establishing said other of the plurality of trains, and a second clutch operable to connect the freely rotatable member with the driven shaft.

2. A change-speed transmission comprising coaxial drive and driven shafts of which an end portion of one is piloted in an end portion of the other, a countershaft, a speed reduction power train including gears drivingly connecting the drive shaft with the countershaft, gears for drivingly connecting the countershaft with the driven shaft and an overrunning clutch device in series with said power train, one of said gears for drivingly connecting the countershaft with the driven shaft being journalled upon said driven shaft, a clutch for releasably directly connecting said journalled gear non-rotatively with the driven shaft and comprising meshable counterparts respectively upon said journalled gear and on the driven shaft, a jaw clutch comprising meshable counterparts respectively upon said journalled gear and non-rotatively associated with the drive shaft, and speed-responsive means operable upon attainment of a predetermined speed of one of said shafts to urge said last recited counterparts into mesh and to slide them into mesh upon synchronization thereof.

3. A change-speed transmission comprising coaxial drive and driven shafts, a countershaft, a one-way-drive power train mobilized for driving the countershaft from the drive shaft, power trains of different speed ratio drivingly connected with the countershaft and including respective members freely rotatable coaxially of the driven shaft and driven by their respective power trains at reduced speeds relatively to the drive shaft when the countershaft is driven by said one-way-drive power train, said power trains being of such speed transmitting ratio that the over-ratio of each of said trains of different speed ratio in series with the one-way-drive train causes the driven shaft to rotate more slowly relative to the drive shaft than does a serial connection of said different speed ratio trains between said shafts, clutch means for selectively incurring connection of said freely rotatable members with the driven shaft for establishing either of said different ratio power trains in a series driving connection with the one-way-drive power train between the drive and driven shafts, a ratchetable jaw clutch including coaxial ratchetable jaw counterparts of which one is connected for rotation with one of said freely rotatable members and of which the other is connected for rotation with the drive shaft, and speed responsive means for meshing said counterparts upon deceleration of the drive shaft sufficiently to effect synchronization of said counterparts whereby said different ratio power trains are connected in series between the drive and driven shafts when only the other of said freely rotatable members is connected with the driven shaft and whereby the drive and driven shafts are directly connected when said one freely rotatable member is connected to the driven shaft.

4. A change-speed transmission comprising coaxial drive and driven shafts, a countershaft, a one-way-drive power train mobilized for driving the countershaft from the drive shaft, a plurality of power trains driven from the countershaft, each including a member journalled upon the driven shaft and mobilized for driving such members at different speeds, clutch means for alternately incurring connection of said journaled members with the driven shaft, said clutch means being effective when connecting the slower driven of such journalled members with the driven shaft for establishing the lower speed train of said plurality of trains in serial relation with said one-way-drive power train between said drive and driven shafts whereby the other of said journalled members is rotated at a speed exceeding that of the driven shaft, said clutch means including an overrunning jaw clutch with overrunning jaw counterparts respectively upon said other journalled member and the driven shaft, the counterpart on said other journalled member being adapted to overrun the counterpart on said shaft during such relative rotation of said member and said shaft, means for yieldably axially urging said clutch counterparts together during such overrun thereof and forcing said counterparts into mesh pursuant to deceleration of the drive shaft and hence of said other member relatively to the driven shaft and thereby establishing the higher speed of said plurality of power trains in serial relation with said one-way-drive power train and in driving relation between the drive and driven shafts, an additional overrunning jaw clutch including overrunning jaw counterparts respectively rotatable with the drive shaft and said other rotatable member and forcible axially toward one another while the counterpart rotatable with the drive shaft overruns the counterpart rotatable with said other member during operation of the aforesaid lower speed train between the drive and driven shafts, and said counterparts of said additional clutch being adapted to be meshed upon synchronization of said other rotatable member and the drive shaft to establish a direct driving connection between the drive and driven shafts while the driven shaft overruns the one-way-drive power train, and means for yieldably urging the counterparts of said additional clutch together for effecting such ratcheting and forcing them into mesh pursuant to their said synchronization.

5. In a manually supervised change-speed transmission, a plurality of forward power trains, a reverse power train, an overrunning clutch disposed in series with the reverse power train and also in series with at least one of said forward power trains, clutch means selectively disposable in spaced-apart positions for respectively establishing the forward power trains and in an intermediate position for disconnecting said forward power trains, means actuatable for controlling establishment of the reverse power train, lockout clutch means engageable for bridging said overrunning clutch, and a cam member rotatable into successive positions pursuant to rotation thereof in one direction, cam follower means operably connecting said clutch means, said reverse power train controlling means and said lockout clutch means with said cam member, said cam member comprising profile sections cooperable with the cam follower means while the cam is in the first of said successive positions to provide for disposal of said clutch means in the intermediate position, for actuation of the reverse train controlling means to establish said reverse train and for engagement of said lockout clutch means, profile sections cooperable with the cam follower means during rotation of the cam from the first to a second of such successive positions to cause actuation of the reverse train controlling means for disconnecting the reverse power train and to cause disengagement of said lockout clutch, a profile section cooperable with the cam follower means during rotation of the cam from the second to a third of such successive positions to effect movement of said clutch means into one of said spaced-apart positions for establishing one of the forward power trains, a profile section cooperable with the cam follower means during rotation of the cam from the third to a fourth of such successive positions to effect movement of said clutch means into the other of said spaced-apart positions for establishing the other of the forward power trains, and a profile section cooperable with the cam follower means during rotation of the cam from the fourth to a fifth of such successive positions to engage said lockout clutch means for converting said other forward power train into a two-way-drive train.

6. In a manually supervised change-speed transmission, a plurality of forward power trains; a reverse power train; an overrunning clutch disposed in series with the reverse power train and also in series with at least one of said forward power trains; clutch means selectively disposable in spaced-apart positions for respectively establishing the forward power trains and in an intermediate position for disconnecting said forward power trains; means actuatable for controlling establishment of the reverse power train; lockout clutch means engageable for bridging said overrunning clutch; a cam member rotatable into successive positions pursuant to rotation thereof in one direction and comprising a "forward" camming slot having a first arcuate section arranged coaxially of said cam member, an oblique section leading from an end of the arcuate section and obliquely to the cam radii traversed thereby to a point of different radial distance from the cam axis than said arcuate section, a second oblique section leading from said point and obliquely to the cam radii traversed thereby to a second point so disposed that the radial distance of said arcuate section from the cam axis is intermediate that of said points, and a second arcuate section leading from said second point and arranged coaxially of said cam; said cam member also comprising a "reverse" camming slot having adjoining arcuate and spur sections of which the arcuate section is coaxial with the cam axis and of which the spur section is arranged obliquely to the cam radii traversed thereby; said cam member also comprising a peripheral camming edge having an arcuate intermediate section coaxial with the cam member and end sections directed obliquely to said intermediate section; "forward" cam follower means disposed in said "forward" slot and occupying an intermediate position radially of said cam member when disposed in registry with the first arcuate section of said slot, in an inward radial position when in registry with one of the points in said slot and in an outward radial position when in registry with the other of said points in said slot, said cam follower means being operably connected with said clutch means and operable when in said intermediate position for disposing said clutch means in its aforesaid intermediate position and when in the inner and outer radial positions for respectively disposing said clutch means in the aforesaid spaced apart positions; "reverse" cam follower means in said "reverse" slot and occupying different positions radially of said cam when in the spur and arcuate sections of said slot and being operably connected with said reverse train controlling means and operable to actuate said controlling means for establishing said reverse train when in registry with said spur section and for disconnecting the said reverse train when in registry with said arcuate section; lockout cam follower means disposed in cooperating relation with said peripheral camming edge of the cam and operatively connected with said lockout clutch means, the intermediate section of said peripheral edge serving to maintain said cam follower means in one radial position with respect to the cam and for thus disconnecting said lockout clutch means and the end sections of said peripheral edge providing for said cam follower means occupying a different position radially of said cam for effecting engagement of said lockout clutch means; and the aforesaid elements of said cam being so constructed and arranged with respect to the said cam follower means that while the cam is in the first of said successive positions the spur section of the "reverse" slot is in registry with the "reverse" cam follower means whereas said first arcuate section of the "forward" slot is in registry with the "forward" cam follower means and one end section of the peripheral camming edge is in registry with the lockout cam follower means, that when said cam is in the second of said positions said first arcuate section of the "forward" slot is in registry with the "forward" cam follower means whereas the arcuate section of the "reverse" slot is in registry with the "reverse" cam follower means and the intermediate section of the peripheral camming edge is in registry with the lockout cam follower means, that when said cam is in the third of said positions the arcuate section of said "reverse" slot is in registry with the "reverse" cam follower means whereas the first point of the "forward" slot is in registry with the "forward" cam follower means and the intermediate section of said peripheral camming edge is in registry with the lockout cam follower means, that when said cam is in the fourth of said successive positions the second of said points in the "forward" slot is in registry with the "forward" cam follower means whereas the arcuate section of the "reverse" slot is in registry with the "reverse" cam follower means and the intermediate section of said peripheral camming edge is in registry with the lockout cam follower means, and when said cam is in the fifth of said positions the second arcuate section of the "forward" slot is in registry with the "forward" cam follower means, whereas the arcuate section of the "reverse" slot is in registry with the "reverse" cam follower means and the other end section of the peripheral camming edge is in registry with the lockout cam follower means.

7. A change-speed transmission comprising coaxial drive and driven shafts; a gear rotatable coaxially of and independently of said shafts; an intermediate speed power train comprising a clutch having counterparts meshable when synchronized for connecting said gear with the drive shaft, means conditionable to yieldably urge said clutch counterparts into mesh, a second gear meshed with the first gear and an overrunning power train portion connecting said second gear with the driven shaft; a relatively low speed power train comprising an overrunning power train portion connecting the drive shaft with said second gear, said first gear and an additional clutch with counterparts meshable when synchronized for connecting the first gear with the driven shaft; means conditionable to urge the additional clutch counterparts into mesh, and a relatively high speed power train comprising said clutches; and said additional clutch being declutchable during establishment of said higher speed train to establish the intermediate speed train.

8. A change-speed transmission comprising coaxial drive and driven shafts, a first speed power train disposed between said shafts and including a plurality of overrunning portions in series; a second speed power train comprising a gear associated with the first train at a section between said overrunning power train portions and being thus connected with the drive shaft through one of said portions, a second gear meshed with the first gear and rotatable coaxially of and independently of said shafts, and a clutch with counterparts meshable when synchronized for connecting said coaxial gear with the driven shaft; a third speed power train comprising said coaxial gear, a clutch with counterparts meshable when synchronized for connecting said coaxial gear with the drive shaft, the first named gear and the other of said power train portions for connecting said first named gear with the driven shaft; a fourth speed power train comprising said clutches; and means conditionable for yieldably urging the counterparts of said clutches into mesh, and the first named of said clutches being declutchable during establishment of said fourth speed train to establish the third speed train.

9. In a change-speed transmission, drive and driven shafts, a relatively low speed one-way-drive starting power train connectable in driving relation between said shafts, a relatively high speed power train including a jaw clutch comprising counterparts which when meshed establish such high speed train between said shafts while shunting out said low speed train, constrainable urging means operable when released for impositively urging said clutch counterparts into mesh, and for meshing the same when they are synchronized, means manipulatable for selectively connecting or disconnecting the low speed train between said shafts, a governor responsive to the speed of one of said shafts, and control means settable under control of said manipulatable means and said speed responsive means, said control means being set to demesh the clutch counterparts and to constrain the impositive urging means when the speed responsive means registers speeds below a minimum or when the manipulatable means is manipulated to disconnect the low speed train, and said control means being set to release the impositive urging means when the speed responsive means registers speeds above such minimum and when the manipulatable means is manipulated to connect the low speed train.

10. In a change-speed transmission, drive and driven shafts, a relatively low speed one-way-drive power train including an overrunning jaw clutch comprising counterparts which are meshable for connecting said train in driving relation between said shafts, a relatively high speed power train including said jaw clutch and a second jaw clutch of the overrunning type and established between said shafts while shunting out the low speed train when said clutches are meshed, an intermediate speed train including said second clutch and establishable between said shafts while shunting out the low speed train when said second clutch is meshed and the first named clutch is open, stressed spring means releasable for impositively urging the counterparts of the respective clutches into mesh, means settable to so release said urging means, manually adjustable control means for said settable means, governor control means for said settable means and responsive to the speed of one of said shafts, said manually adjustable means being operable when selectively adjusted to enable the governor control means to set the settable means for releasing the spring means as aforesaid upon said governor registering a predetermined speed, and means operable at will while said clutches are meshed to open the first named thereof for establishing said intermediate speed train.

11. In a change-speed transmission, drive and driven shafts, a first speed one-way-drive power train connectable in driving relation between said shafts, a second speed one-way-drive power train including an overrunning jaw clutch comprising counterparts which are meshable for connecting said train in driving relation between said shafts, a fourth speed power train including said overrunning jaw clutch and a second overrunning jaw clutch and establishable between said shafts while shunting out the first and second speed trains when said clutches are meshed, a third speed train including said second jaw clutch and established between said shafts while shunting out the first and second speed trains when said second clutch is meshed and the first named clutch is open, stressed spring means releasable for impositively urging the counterparts of the respective clutches into mesh, means settable to so release said spring means, governor control means for said settable means and responsive to the speed of one of said shafts, means manually adjustable for connecting the first speed train and also serving as manual control means for said settable means, said manually adjustable means being operable while adjusted to establish the first speed train to enable the governor control means to set the settable means for releasing the spring means as aforesaid upon said governor registering a predetermined speed, and means operable at will for overcoming the effect of the urging means upon the first named clutch.

12. In a change-speed transmission, drive and driven shafts, a first speed one-way-drive power train connectable in driving relation between said shafts, a second speed one-way-drive power train including an overrunning jaw clutch comprising counterparts which are meshable for connecting said train in driving relation between said shafts, a fourth speed power train including said overrunning jaw clutch and a second overrunning jaw clutch and establishable between said shafts while shunting out the first and second speed trains when said clutches are meshed, a third speed train including said second jaw clutch and established between said shafts while shunting out the first and second speed trains when said second clutch is meshed and the first named clutch is open, stressed springs respectively associated with said clutches and individually releasable for impositively urging the counterparts of their respective clutches into mesh, means respectively associated with said springs and settable to so release the same, governor control means for the settable means associated with the spring for the second clutch, means manually adjustable for connecting the first speed train and also serving as a manual control means for each of the aforesaid settable means, said manually adjustable means being operable while adjusted to establish the first speed train to set the settable means for releasing the spring associated with the first of said clutches and also being operable while so adjusted to enable the governor control means to set the settable means for releasing the spring associated with the second of said clutches upon said governor registering a predetermined speed, and means operable at will for imparting to the first clutch a force in opposition to the urging means associated therewith and of sufficient magnitude for opening said clutch.

13. In a change-speed transmission, drive and driven shafts, a relatively low speed one-way-drive starting power train connectable in driving relation between said shafts for transmitting power therebetween when the high speed train is disconnected, a relatively high speed power train including a jaw clutch comprising counterparts which when meshed establish such high speed train between said shafts while shunting out the low speed train, constrainable urging means operable when released for impositively urging said clutch counterparts into mesh and for meshing the same when they are synchronized, means manipulatable for selectively connecting or disconnecting the low speed train between said shafts, a governor responsive to the speed of at least one of said shafts, and control means settable under control of said manipulatable means and said speed responsive means, said control means being set to demesh the clutch counterparts and to constrain the impositive urging means when the speed responsive means registers speeds below a minimum or when the manipulatable means is manipulated to disconnect the low speed train, and said control means being set to release the impositive urging means when the speed responsive means registers speeds above such minimum and when the manipulatable means is manipulated to connect the low speed train.

14. In a change-speed transmission, drive and driven shafts, a relatively low speed one-way-drive power train connectable in driving relation between said shafts, a relatively high speed power train including a jaw clutch comprising counterparts which when meshed establish such high speed train between said shafts while shunting out the low speed train, means for impositively urging the clutch counterparts into mesh, cam members each operable when in one position for restraining said urging means but being independently movable into different respective positions for nullifying their restraining action, means displaceable for connecting the low speed train between said shafts and operably connected with one of said cam members for moving the same into its said different position pursuant to such displacement, and a governor responsive to the speed of one of said shafts, said governor being operably associated with the other cam member and effective for causing movement of such member into its said different position when registering speeds above a predetermined minimum.

15. In a change-speed transmission, drive and driven shafts, a relatively low speed one-way-drive power train connectable in driving relation between said shafts, an intermediate speed one-way-drive power train including an overrunning jaw clutch operable when the counterparts thereof are meshed to establish such train between said shafts while shunting out the low speed train, a relatively high speed power train including a second jaw clutch which is operable when the counterparts thereof are meshed to establish such high speed train between said shafts while shunting out the aforesaid trains, stressed spring means releasable for impositively urging the counterparts of the respective clutches into mesh, means displaceable for connecting said relatively low speed train between said shafts, a governor responsive to the speed of one of said shafts, and control means settable to release said spring means under control of said governor and said displaceable means, and said control means being so set when the governor registers speeds above a predetermined minimum and when the displaceable means is set to connect the relatively low speed train.

16. In a change speed power transmitting mechanism, a driving member, a driven member, speed responsive connecting apparatus including a clutch reposing between said members for becoming disengaged when sufficiently slow rotative speed is attained by a part in said mechanism, transmitting means for rotating said driven member from said driving member at reduced speed driving ratio whose driving connections in that capacity will be established between said members as long as said clutch is disengaged, transmitting means for rotating said driven member from said driving member at a faster speed driving ratio whose driving connections will be completed in that capacity between said members upon engagement of said clutch, transmitting means mobilized for rotating said driven member from said driving member at an intermediate speed driving ratio, with respect to said speed reducing and said faster speed transmitting means, by said engagement of said clutch and including a one-way force exerting device whereby such mobilization thereof is possible concurrently with said establishment of the faster speed transmitting means, and spring-actuated automatically engageable clutch means normally engaged for causing said faster speed transmitting means to be established between said members when said first named clutch engages and being disengageable at the will of the operator thereby to abnormally render said faster speed transmitting means no drive whereby the intermediate speed transmitting means may be intermittently enabled to rotate said driven member from said driving member in the stead of said faster speed transmitting means upon immobilizing the driving connections of the latter.

17. Mechanism as in claim 16 wherein there is a still lower speed transmitting means and wherein when said clutch disengageable at the will of the operator is disengaged prior to engagement of said first named clutch said speed reducing driving ratio transmitting means will be supplanted by said still lower speed transmitting means for rotating said driven member from said driving member.

18. A power transmitting mechanism including rotatable drive and driven members, an overrunning slow speed driving ratio power train normally established between said members while standstill or slow speed rotation prevails in the mechanism, a faster speed driving ratio power train comprising means automatically operable to establish such train between said members when certain conditions, attending appreciable speeds of one of said members, have been attained, an intermediate speed driving ratio power train becoming mobilized between said members simultaneously with establishment of said faster driving ratio train under the control of said automatically operable means and including a one-way force exerting device permitting such simultaneous establishment of said faster driving ratio train and mobilization of the intermediate ratio train, and means employable at will to abnormally disestablish said faster speed driving ratio train to establish the intermediate train and thus create a period of driving manifestation therefor between said members but whereby the driving connection of said faster speed driving ratio train is not irretrievably disestablished beyond automatic reestablishment upon the passing of influences of said means for disestablishing said faster driving ratio train.

19. The mechanism described in claim 18 and wherein said means automatically operable to simultaneously establish the faster speed driving ration train and the mobilization of the intermediate speed driving ratio train between said drive and driven members comprises automatic speed responsive clutch mechanism operable upon a single occurrence of temporary reduction in the speed of the drive member relative to the driven member to both establish said faster speed driving ratio train and complete mobilization of said intermediate speed driving ratio train between said members.

20. The mechanism described in claim 18 and wherein said means employable at will to abnormally disestablish said faster driving ratio train comprises a system of engageable and disengageable members normally for engagement, having resilient means tending to effect their engagement, and means to effect disengagement of said engageable members, and said members when engaged forming means mobilizing said faster speed driving ratio train so it is establishable between said members by said automatically operable means whereby optional disengagement of said engageable members would disrupt said faster driving ratio train and thus exert control over the function of said automatically operable means.

21. In power transmitting apparatus, the combination of a driving member, a driven member, automatically variable change speed transmission mechanism comprising a power train of given speed and a power train of faster speed respectively establishable in driving relation between said members for changing the speed of the driven member from a given speed to a faster speed relatively to the driving member, said transmission also comprising a clutch engageable for establishing the faster speed train, means operable to engage said clutch in response to deceleration of the driving member relatively to the driven member conditionally upon one of said members having attained a minimum speed, an intermediate speed train establishable for rotating said driven member from said driving member at an intermediate speed with respect to said given and said faster speeds, the clutching function of said clutch being depended upon by said intermediate speed train for mobilizing the same to render it potentially establishable, and means for abnormally rendering an established state of said faster driving ratio neutral between said members while preserving the engagement of said clutch and utilizing the same in causing said mobilized intermediate speed ratio to come into play for rotating said driven member.

22. A change-speed transmission comprising coaxial drive and driven shafts, a countershaft, an overrunning power train disposed for driving the countershaft from the drive shaft, a second power train drivingly connectible between the countershaft and the driven shaft, a reversible power train alternatively establishable in series with the other two trains between the drive and driven shafts and including a member freely rotatable about the driven shaft, the serial establishment of the reversible train with the overrunning train obtaining one speed drive of the driven shaft relatively to the drive shaft, said freely rotatable member being concurrently connectible with said shafts to obtain a higher speed drive of the driven shaft relatively to the drive shaft, the serial establishment of the reversible train with said second train obtaining an intermediate speed drive of the driven shaft relatively to the drive shaft, clutch means settable in a first adjustment wherein the freely rotatable member is connected with the driven shaft to establish the serial connection of the reversible train with the overrunning train and hence the one speed of drive of the driven shaft, a clutch engageable for connecting said freely rotatable member with the drive shaft, means operable subject to a predetermined minimum speed of one of said shafts for engaging said clutch while said clutch means is set in said first adjustment whereby to effect a shift from the one speed drive to said higher speed drive, and said clutch means being settable at the will of an operator into a second adjustment wherein the freely rotatable member is disconnected from the driven shaft and the second train is drivingly connected with the driven shaft for establishing the intermediate speed drive of the driven shaft.

23. A change-speed transmission comprising coaxial drive and driven shafts, a countershaft, a first overrunning power train disposed for driving the countershaft from the drive shaft, a second overrunning power train operable to drive the driven shaft from the countershaft, a reversible power train alternatively establishable in series with the other two trains between the drive and driven shafts and including a member freely rotatable about the driven shaft, the serial establishment of the reversible train with the first overrunning train obtaining one speed drive of the driven shaft relatively to the drive shaft while the second overrunning train overruns, said rotatable member being concurrently connectible with said shafts to obtain a higher speed drive of the driven shaft relatively to the drive shaft while both of said overrunning trains overrun, the serial establishment of the reversible train with the second overrunning train obtaining an intermediate speed drive of the driven shaft relatively to the drive shaft while the first overrunning train overruns and while power is transmitted through the reversible train in a reversed direction to that of transmittal during the one speed drive, first and second clutches engageable for respectively connecting the freely rotatable member with the drive shaft and the driven shaft, means operable subject to a predetermined speed of one of said shafts for engaging the first clutch while the second clutch is engaged whereby to effect a shift from the one speed drive to said higher speed drive, and means operable at the will of an operator, during said higher speed drive, for disengaging the second clutch for instantaneously establishing the intermediate speed drive of the driven shaft.

24. The combination set forth in claim 23 wherein said first and second clutches are of the ratchetable jaw type, the first of said clutches including counterparts respectively constrained for rotation with the drive shaft and with said freely rotatable member and being meshable to engage this clutch incident to temporary speed reduction of the drive shaft, the second of said clutches including counterparts respectively constrained for rotation with said freely rotatable member and with the driven shaft and being meshable to engage this clutch incident to temporary speed reduction of said member relative to the driven shaft, and means for urging the counterparts of the second clutch into mesh following the disengagement of this clutch at the will of the operator whereby shift from the intermediate speed drive, then obtaining, into the higher speed drive is attainable by incurring temporary speed reduction of said drive shaft and hence of freely rotatable member.

25. The combination set forth in claim 23 wherein the first and second overrunning power trains are established in serial driving relation between the drive and driven shafts to obtain a lowest speed drive of the driven shaft relatively to the drive shaft while both of said clutches are disengaged and wherein said clutches are of the ratchetable jaw type, the first of said clutches comprising counterparts respectively constrained for rotation with the drive shaft and with said freely rotatable member and meshable upon synchronization thereof to engage this clutch, and the second of said clutches including counterparts respectively constrained for rotation with said freely rotatable member and with the driven shaft and meshable upon synchronization thereof to engage this clutch, means operable incident to the attainment of a predetermined minimum speed of one of said shafts for pressing the counterparts of said clutches into ratcheting relation and for causing engagement thereof when synchronization of their counterparts occurs, such synchronization of the second clutch counterparts being incurred by a temporary reduction in speed of the drive shaft and hence of the freely rotatable member relatively to the driven shaft, and synchronization of the first clutch counterparts being attained by a further temporary reduction in speed of the drive shaft relatively to the driven shaft.

26. The combination set forth in claim 23 wherein the first and second overrunning power trains are established in serial driving relation between the drive and driven shafts to obtain a lowest speed drive of the driven shaft relatively to the drive shaft while both of said clutches are disengaged and wherein said clutches are of the ratchetable jaw type, the first of said clutches comprising counterparts respectively constrained for rotation with the drive shaft and with said freely rotatable member and meshable upon synchronization thereof to engage this clutch, and the second of said clutches including counterparts respectively constrained for rotation with said freely rotatable member and with the driven shaft and meshable upon synchronization thereof to engage this clutch, means for yieldably pressing the counterparts of the second clutch into engagement or ratcheting relation and for causing engagement thereof when synchronization of these counterparts occurs, means manually settable for electively nullifying the effect of said urging means and causing the disengaged condition of second clutch to prevail, means operable incident to the attainment of a predetermined minimum speed of one of said shafts for pressing the counterparts of the first clutch into ratcheting relation and for causing engagement thereof when synchronization of its counterparts occurs, such synchronization of the first clutch counterparts being attained by a temporary reduction in speed of the drive shaft relatively to the driven shaft, and synchronization of the second clutch, following the instantaneous disengagement thereof, also being attained by a temporary reduction in speed of the drive shaft.

27. In a power transmitting mechanism; a drive shaft; a driven shaft; a slow speed power train operable to transmit driving force from the drive shaft to the driven shaft and including a one-way force exerting device and a releasable clutch which is engaged as a precedent to the operation of such power train; a relatively fast speed power train including said clutch and also a second clutch which is operable when engaged during engagement of the first clutch to establish such fast speed train in driving relation between the shafts while causing overrun of the slow speed train; means operable conditionally upon one of the shafts attaining a minimum speed to cause engagement of the second clutch; an intermediate speed power train including the second clutch and mobilized between the shafts by the closing of the second clutch, the intermediate speed train including a one-way force exerting device to facilitate such mobilization during operation of the fast speed train; and means for optionally disengaging the first clutch for disconnecting the fast speed train and enabling the intermediate speed train to transmit power from the drive shaft to the driven shaft.

28. Mechanism as in claim 27, wherein there is means operable to engage the first clutch in response to deceleration of the drive shaft relatively to the driven shaft, wherein there is a still slower speed power train establishable between said shafts incident to concurrent release of said clutches, and such still slower speed power train being overrunning in character to remain mobilized while accommodating an up-shift to the slow speed train by engagement of the first clutch pursuant to such deceleration of the drive shaft or a shift into the fast speed train pursuant to prolongation of such deceleration and attainment of said minimum speed by the one shaft.

29. Mechanism as in claim 28, wherein there is means optionally operable to initially release the first clutch for establishing the still slower speed train as the starting train or for causing engagement of the first clutch for establishing the slow speed train as the starting train.

30. In a power transmitting mechanism; a drive shaft; a driven shaft; a slow speed overrunnable power train establishable to transmit driving force from the drive shaft to the driven shaft and including a releasable clutch which is engaged as a precedent to the operation of such train; an intermediate speed overrunnable power train for transmitting driving force from the drive shaft to the driven shaft at greater relative speed and including a second clutch engageable to mobilize such train preparatory to establishment thereof for such power transmittal; a fast speed power train including both of said clutches and established in driving relation between the shafts for driving the driven shaft from the drive shaft at a still greater relative speed when both of the clutches are engaged; means operable to engage the second clutch in response to deceleration of the drive shaft relatively to the driven shaft during establishment and overrun of the slow speed train and thereby establish the fast speed train incident to skipping establishment of the intermediate speed train but incurring the mobilized condition thereof; and means for optionally releasing the first clutch to establish the intermediate speed train.

31. The combination as in claim 30, wherein there is means operable for reengaging said first clutch to reestablish the fast speed train pursuant to deceleration of the drive shaft relatively to the driven shaft during establishment and overrun of the intermediate speed train.

32. The combination as in claim 30, wherein there is means responsive to a predetermined reduction in the speed of one of said shafts for disengaging said second clutch of the fast speed train and thereby reestablish the mobilized slow speed train.

OSCAR H. BANKER.

REFERENCES CITED

The following references are of record in the file of this patent:

UNITED STATES PATENTS

| Number | Name | Date |
| --- | --- | --- |
| 1,396,512 | Fergusson | Nov. 18, 1921 |
| 1,662,092 | Warhus | Mar. 13, 1928 |
| 1,727,577 | Wemp | Sept. 10, 1929 |
| 1,861,931 | Moldenhauer | June 7, 1932 |

(Other references on following page)

UNITED STATES PATENTS

| Number | Name | Date |
|---|---|---|
| 1,903,221 | MacKenzie | Mar. 28, 1933 |
| 1,909,242 | Wagner | May 16, 1933 |
| 1,949,167 | Maybach | Feb. 27, 1934 |
| 1,979,435 | Barnett | Nov. 6, 1934 |
| 1,980,505 | Snow et al. | Nov. 13, 1934 |
| 1,983,955 | Von Soden-Fraunhofen | Dec. 11, 1934 |
| 1,985,888 | Banker | Jan. 1, 1935 |
| 1,990,690 | Hantschel et al. | Feb. 12, 1935 |
| 2,012,296 | Banker | Aug. 27, 1935 |
| 2,019,174 | Clark | Oct. 29, 1935 |
| 2,054,222 | Lapsley | Sept. 15, 1936 |
| 2,061,832 | Cotterman | Nov. 24, 1936 |
| 2,086,600 | Burtnett | July 13, 1937 |
| 2,094,449 | Forichon | Sept. 28, 1937 |
| 2,133,548 | Lassiter | Oct. 18, 1938 |
| 2,136,049 | Hering | Nov. 8, 1938 |
| 2,136,311 | Burtnett | Nov. 15, 1938 |
| 2,140,562 | Banker | Dec. 20, 1938 |
| 2,181,460 | Meyer | Nov. 28, 1939 |
| 2,193,267 | Burtnett | Mar. 12, 1940 |
| 2,199,095 | Banker | Apr. 30, 1940 |
| 2,225,493 | Barnes | Dec. 17, 1940 |
| 2,247,478 | Burtnett | July 1, 1941 |
| 2,257,674 | Dunn | Sept. 30, 1941 |
| 2,262,747 | Banker | Nov. 18, 1941 |
| 2,322,479 | Schojlin | June 22, 1943 |
| 2,333,668 | Neracher et al. | Nov. 9, 1943 |
| 2,349,297 | Neracher et al. | May 23, 1944 |

FOREIGN PATENTS

| Number | Country | Date |
|---|---|---|
| 321,837 | Great Britain | Nov. 21, 1929 |
| 342,920 | Great Britain | Feb. 12, 1931 |
| 455,699 | Great Britain | Jan. 18, 1935 |
| 457,646 | Great Britain | Dec. 2, 1936 |
| 816,820 | France | May 10, 1937 |
| 612,807 | Germany | May 6, 1935 |
| 88,086 | Sweden | Dec. 8, 1936 |

OTHER REFERENCES

Automotive Industries, January 23, 1937, page 124.